US012586464B2

(12) United States Patent
Uchiyama et al.

(10) Patent No.: US 12,586,464 B2
(45) Date of Patent: Mar. 24, 2026

(54) INFORMATION PROCESSING APPARATUS, INFORMATION PROCESSING SYSTEM, AND INFORMATION PROCESSING METHOD

(71) Applicant: SONY GROUP CORPORATION, Tokyo (JP)

(72) Inventors: Hiromasa Uchiyama, Tokyo (JP); Ryota Kimura, Tokyo (JP); Shinichiro Tsuda, Tokyo (JP); Naoyuki Sato, Tokyo (JP); Masane Kawasaki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 822 days.

(21) Appl. No.: 17/754,374

(22) PCT Filed: Oct. 5, 2020

(86) PCT No.: PCT/JP2020/037690
§ 371 (c)(1),
(2) Date: Mar. 31, 2022

(87) PCT Pub. No.: WO2021/070768
PCT Pub. Date: Apr. 15, 2021

(65) Prior Publication Data
US 2022/0343757 A1 Oct. 27, 2022

(30) Foreign Application Priority Data
Oct. 9, 2019 (JP) ................................. 2019-185860

(51) Int. Cl.
G08G 1/01 (2006.01)
B60W 40/04 (2006.01)
G08G 1/095 (2006.01)

(52) U.S. Cl.
CPC ........... *G08G 1/0145* (2013.01); *B60W 40/04* (2013.01); *G08G 1/095* (2013.01);
(Continued)

(58) Field of Classification Search
CPC ..... G08G 1/0145; G08G 1/095; B60W 40/04; B60W 2530/201; B60W 2556/45; B60W 2520/10; B60W 2720/10
See application file for complete search history.

(56) References Cited

U.S. PATENT DOCUMENTS 10,474,904 B1 * 11/2019 Correnti ................. B60Q 9/002
11,043,123 B2 * 6/2021 Hori ...................... B60W 30/16
(Continued)

FOREIGN PATENT DOCUMENTS

CN 102555940 A 7/2012
CN 105096655 A 11/2015
(Continued)

OTHER PUBLICATIONS

International Search Report and Written Opinion of PCT Application No. PCT/JP2020/037690, issued on Dec. 28, 2020, 08 pages of ISRWO.

*Primary Examiner* — Peter D Nolan
*Assistant Examiner* — Wae L Louie
(74) *Attorney, Agent, or Firm* — CHIP LAW GROUP

(57) ABSTRACT

To realize an apparatus and a method for receiving a recognition level of an own vehicle from another vehicle and/or an infrastructure facility and performing control to improve a recognition level. A recognition level of the own vehicle calculated by another vehicle or the infrastructure facility is received, and control for improvement of a recognition level of the own vehicle is executed in accordance with the received recognition level. As the control for improvement of a recognition level of the own vehicle, any (Continued)

process is executed among: (a) a process of reducing a traveling speed or stopping; (b) a process of turning on a light; and (c) a process of changing transmission information from the own vehicle. As the process of changing transmission information, a process of adding, to the transmission information, vehicle location information, vehicle speed information, vehicle size information, or reference marker position information is executed.

18 Claims, 7 Drawing Sheets

(52) U.S. Cl.
CPC ... *B60W 2520/10* (2013.01); *B60W 2530/201* (2020.02); *B60W 2556/45* (2020.02); *B60W 2720/10* (2013.01)

(56) References Cited

U.S. PATENT DOCUMENTS

| | | | | |
|---|---|---|---|---|
| 2014/0020098 | A1* | 1/2014 | Stahlin | H04W 4/44 726/22 |
| 2015/0100189 | A1* | 4/2015 | Tellis | G08G 1/166 701/23 |
| 2015/0187216 | A1* | 7/2015 | Kwak | G08G 1/096775 701/117 |
| 2015/0329049 | A1 | 11/2015 | Kanou et al. | |
| 2016/0082903 | A1* | 3/2016 | Haggerty | B60R 16/023 701/23 |
| 2016/0231746 | A1* | 8/2016 | Hazelton | G05D 1/0274 |
| 2018/0059675 | A1* | 3/2018 | Bevot | G05D 1/0274 |
| 2018/0095457 | A1* | 4/2018 | Lee | B60W 50/029 |
| 2018/0304807 | A1 | 10/2018 | Boesch | |
| 2019/0072667 | A1* | 3/2019 | Duque Biarge | G01S 13/4454 |
| 2019/0270446 | A1* | 9/2019 | Watanabe | B60W 10/18 |
| 2019/0287397 | A1 | 9/2019 | Wiebel-Herboth | |
| 2020/0272193 | A1* | 8/2020 | Battlogg | G05G 5/03 |
| 2020/0386858 | A1* | 12/2020 | Rittberg | B60T 7/12 |
| 2020/0410788 | A1* | 12/2020 | Uchiyama | G01M 17/007 |
| 2021/0061312 | A1* | 3/2021 | Wang | B60W 60/0015 |
| 2022/0343757 | A1* | 10/2022 | Uchiyama | G08G 1/096725 |
| 2023/0079860 | A1* | 3/2023 | Kuehner | B60W 50/10 701/41 |
| 2023/0127320 | A1* | 4/2023 | Gräbner | B60W 40/04 701/26 |
| 2024/0308524 | A1* | 9/2024 | Kanda | B60W 50/029 |

FOREIGN PATENT DOCUMENTS

| | | |
|---|---|---|
| CN | 108028015 A | 5/2018 |
| CN | 108713221 A | 10/2018 |
| CN | 109515434 A | 3/2019 |
| CN | 109658527 A | 4/2019 |
| CN | 110217228 A | 9/2019 |
| CN | 110281920 A | 9/2019 |
| DE | 102015208782 A1 | 11/2015 |
| EP | 3352154 A1 | 7/2018 |
| EP | 3410382 A1 | 12/2018 |
| JP | 2006065667 A | 3/2006 |
| JP | 2007241729 A | 9/2007 |
| JP | 2013050411 A | 3/2013 |
| JP | 2013083576 A | 5/2013 |
| JP | 2015-219773 A | 12/2015 |
| JP | 2019-021201 A | 2/2019 |
| JP | 2019-096161 A | 6/2019 |
| JP | 2019-105941 A | 6/2019 |
| JP | 2019-151206 A | 9/2019 |
| KR | 20190096868 A | 8/2019 |
| WO | WO-2009060581 A1 | 5/2009 |
| WO | WO-2019049714 A1 | 3/2019 |

* cited by examiner

1 INFORMATION PROCESSING SYSTEM

20 MANAGEMENT SERVER

40 NETWORK

30 ROADSIDE COMMUNICATION UNIT (RSU)

10 VEHICLE

10 VEHICLE

10 VEHICLE

10 VEHICLE

*FIG. 2*

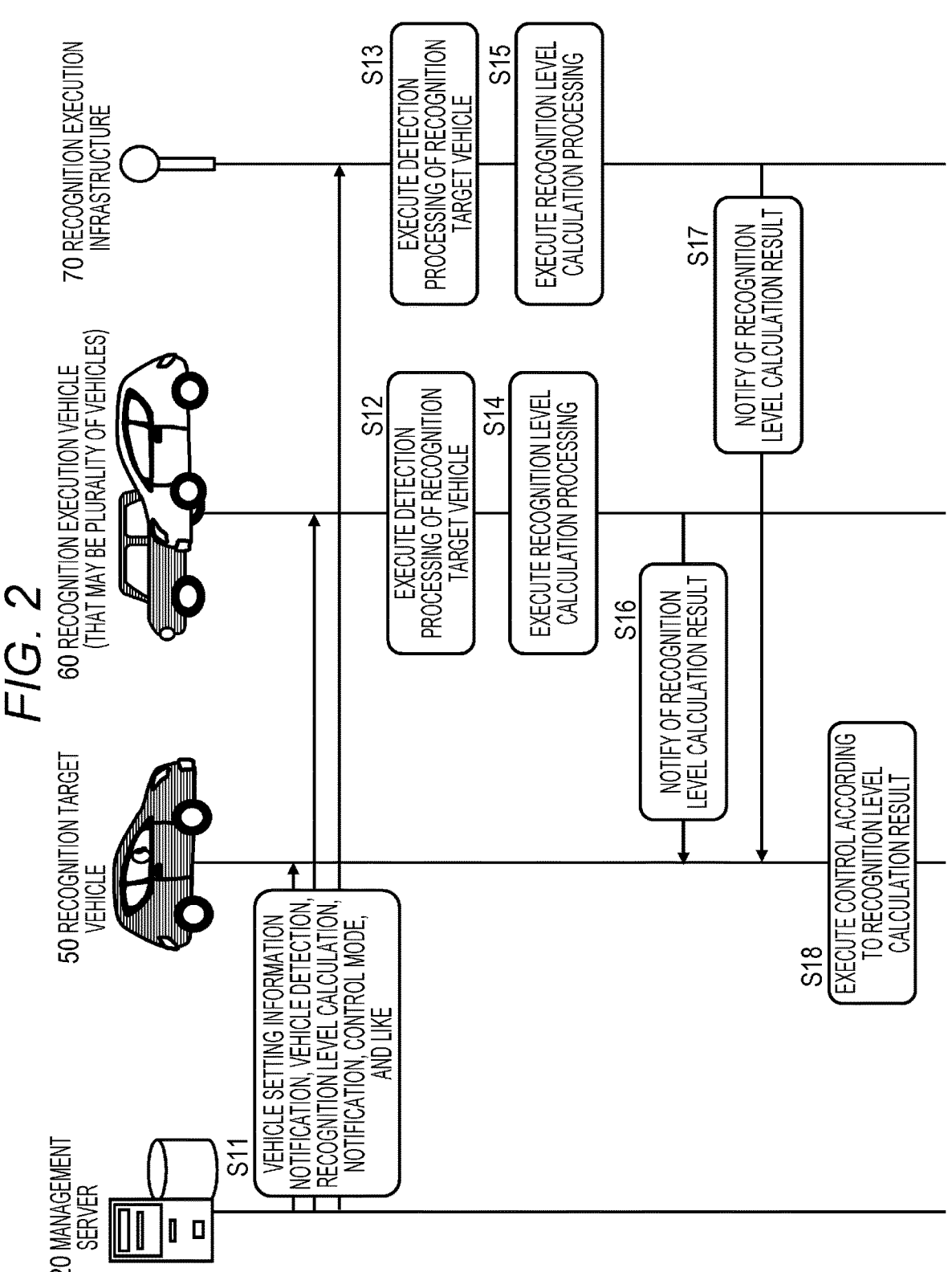

20 MANAGEMENT SERVER

50 RECOGNITION TARGET VEHICLE

60 RECOGNITION EXECUTION VEHICLE (THAT MAY BE PLURALITY OF VEHICLES)

70 RECOGNITION EXECUTION INFRASTRUCTURE

S11 VEHICLE SETTING INFORMATION NOTIFICATION, VEHICLE DETECTION, RECOGNITION LEVEL CALCULATION, NOTIFICATION, CONTROL MODE, AND LIKE

S12 EXECUTE DETECTION PROCESSING OF RECOGNITION TARGET VEHICLE

S14 EXECUTE RECOGNITION LEVEL CALCULATION PROCESSING

S13 EXECUTE DETECTION PROCESSING OF RECOGNITION TARGET VEHICLE

S15 EXECUTE RECOGNITION LEVEL CALCULATION PROCESSING

S16 NOTIFY OF RECOGNITION LEVEL CALCULATION RESULT

S17 NOTIFY OF RECOGNITION LEVEL CALCULATION RESULT

S18 EXECUTE CONTROL ACCORDING TO RECOGNITION LEVEL CALCULATION RESULT

*FIG. 6*

INFORMATION PROCESSING APPARATUS, INFORMATION PROCESSING SYSTEM, AND INFORMATION PROCESSING METHOD

CROSS REFERENCE TO RELATED APPLICATIONS

This application is a U.S. National Phase of International Patent Application No. PCT/JP2020/037690 filed on Oct. 5, 2020, which claims priority benefit of Japanese Patent Application No. JP 2019-185860 filed in the Japan Patent Office on Oct. 9, 2019. Each of the above-referenced applications is hereby incorporated herein by reference in its entirety.

TECHNICAL FIELD

The present disclosure relates to an information processing apparatus, an information processing system, and an information processing method. More specifically, the present disclosure relates to an information processing apparatus, an information processing system, and an information processing method for analyzing a recognition level of a vehicle to perform control according to an analysis result, for example, control for improvement of a recognition level, on the basis of information of communication between mobile devices such as vehicles or communication between a vehicle and an infrastructure system.

BACKGROUND ART

Recently, technology development related to automatic driving has been actively performed.

The automatic driving technology is a technology for detecting an obstacle or the like by using a camera or a sensor provided in a vehicle (automobile) and automatically traveling on a road, and is predicted to rapidly spread in the future.

In a case where the automatic driving vehicle travels on a road, it is also important that the own vehicle is reliably recognized by other cars.

If another vehicle cannot recognize the own vehicle, there is a risk that the another vehicle collides with the own vehicle.

Therefore, in the automatic driving, it is also an important process to check whether or not the own vehicle is reliably recognized from other cars.

Furthermore, in the automatic driving, for example, there is a case where communication is also performed between the vehicle and a road facility (infrastructure) such as a street lamp or a pole beside a road, and control may be performed so that the automatic driving vehicle can travel on a normal traveling road.

As described above, the automatic driving vehicle executes driving control while recognizing a situation of a surrounding environment and surrounding vehicles. In a case where a plurality of automatic driving vehicles is traveling, it is necessary to mutually recognize other cars between the automatic driving vehicles, and to mutually recognize the presence between the infrastructure and each vehicle, to travel.

Whereas, in an automatic driving environment, a recognition target may not be successfully recognized due to influence of weather or the like. Even in such a case, a mechanism to perform automatic driving without an accident is required.

Note that, for example, Patent Document 1 (Japanese Patent Application Laid-Open No. 2019-21201) discloses a configuration to generate a parameter for detecting an obstacle or another vehicle from an image including the obstacle, the another vehicle, and the like, that are difficult to be recognized, by transmitting a camera-captured image of a vehicle to a learning server and executing learning processing of a large number of images in the learning server.

The parameter generated by the server is provided to each vehicle, and each vehicle can immediately detect the obstacle even from an unclear image, by image processing to which the parameter is applied.

However, in this disclosed configuration, accuracy of the parameter generated by the learning server depends on the number and quality of the collected images. Therefore, there is a problem that a recognition rate reaches a plateau when an obtained information amount is small. A method for improving the recognition rate even in such a case where recognition is difficult is desired.

CITATION LIST

Patent Document

Patent Document 1: Japanese Patent Application Laid-Open No. 2019-21201

SUMMARY OF THE INVENTION

Problems to be Solved by the Invention

An object of the present disclosure is to provide an information processing apparatus, an information processing system, and an information processing method for analyzing a recognition level of a vehicle to perform control according to an analysis result, for example, control for improvement of a recognition level, on the basis of information of communication between mobile devices such as vehicles or communication between a vehicle and an infrastructure system.

Solutions to Problems

A first aspect of the present disclosure is
an information processing apparatus including:
a communication unit configured to receive a recognition level of an own vehicle, the recognition level being calculated by another vehicle or an infrastructure facility; and
a control unit configured to execute control for improvement of a recognition level of the own vehicle in accordance with the received recognition level.

Moreover, a second aspect of the present disclosure is
an information processing apparatus including:
a control unit configured to calculate a recognition level of a recognition target vehicle, and
execute control for improvement of a recognition level in accordance with the calculated recognition level.

Moreover, a third aspect of the present disclosure is
an information processing system including: a recognition target vehicle; and a recognition execution vehicle, in which
the recognition execution vehicle
executes recognition processing of the recognition target vehicle, calculates a recognition level according to a recognition result, and transmits the calculated recognition level to the recognition target vehicle, and the recognition target vehicle executes control for improvement of a recognition level of an own vehicle in accordance with a recognition level received from the recognition execution vehicle.

Moreover, a fourth aspect of the present disclosure is an information processing method executed in an information processing apparatus, the information processing method including:

receiving, by a communication unit, a recognition level of an own vehicle, the recognition level being calculated by another vehicle or an infrastructure facility; and executing, by a control unit, control for improvement of a recognition level of the own vehicle in accordance with the received recognition level.

Still other objects, features, and advantages of the present disclosure will become apparent from the more detailed description based on the embodiment of the present disclosure as described later and the attached drawings. Note that a system in this specification is a logical set configuration of a plurality of devices, and is not limited to one in which a device of each configuration is in a same casing.

According to a configuration of an embodiment of the present disclosure, an apparatus and a method for receiving a recognition level of an own vehicle from another vehicle and/or an infrastructure facility and performing control to improve a recognition level are realized.

Specifically, for example, a recognition level of the own vehicle calculated by another vehicle or the infrastructure facility is received, and control for improvement of a recognition level of the own vehicle is executed in accordance with the received recognition level. As the control for improvement of a recognition level of the own vehicle, any process is executed among: (a) a process of reducing a traveling speed or stopping; (b) a process of turning on a light; and (c) a process of changing transmission information from the own vehicle. As the process of changing transmission information, a process of adding, to the transmission information, vehicle location information, vehicle speed information, vehicle size information, or reference marker position information is executed.

With this configuration, an apparatus and a method for receiving a recognition level of an own vehicle from another vehicle and/or an infrastructure facility and performing control to improve a recognition level are realized.

Note that the effects described in this specification are merely examples and are not limited, and additional effects may be present.

BRIEF DESCRIPTION OF DRAWINGS

FIG. 2 is a diagram for explaining a processing sequence according to a first embodiment of the present disclosure.

FIG. 6 is a diagram illustrating a configuration example of a vehicle control system provided in a vehicle.

MODE FOR CARRYING OUT THE INVENTION

Figure 1:
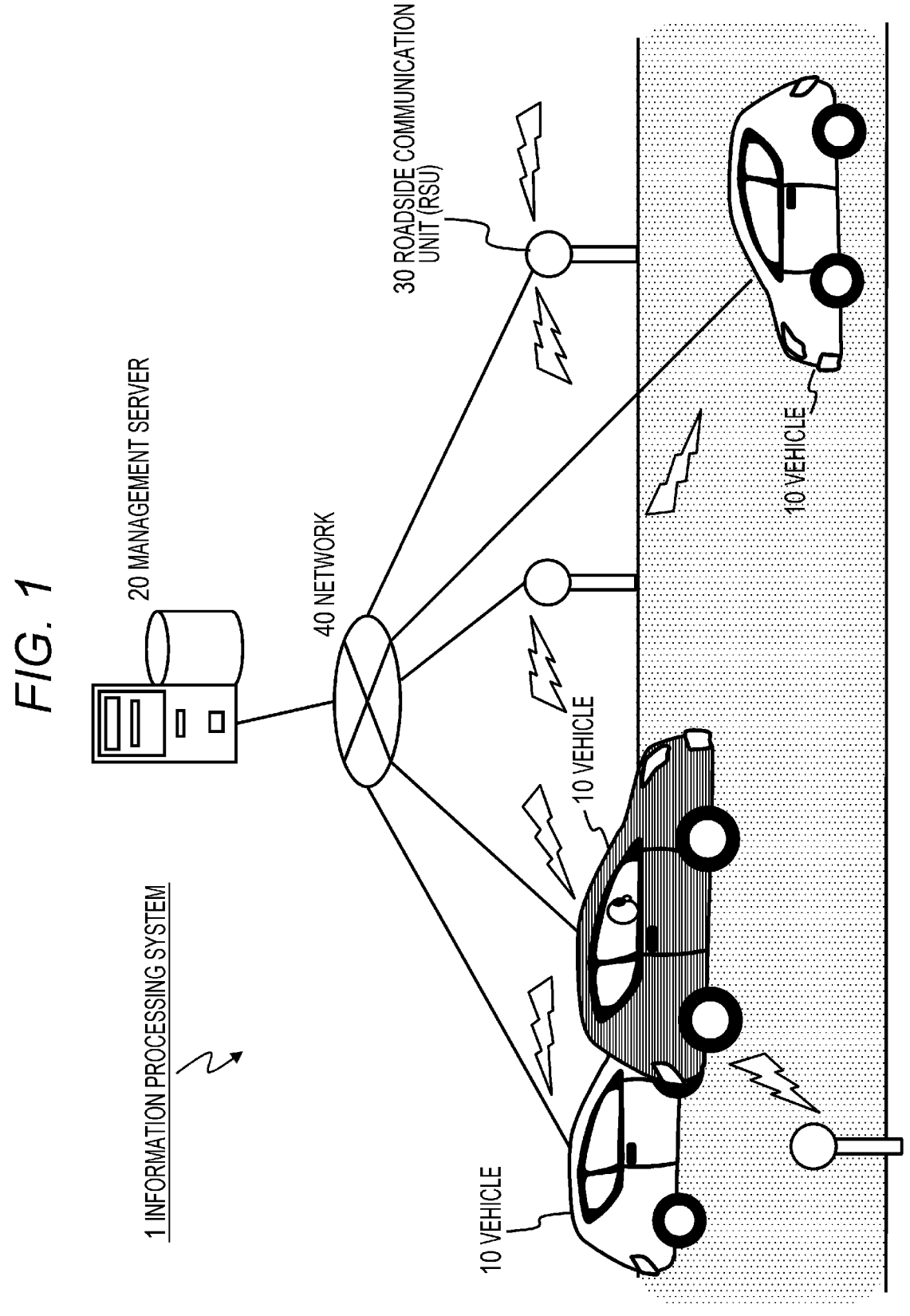
FIG. 1 is a view for explaining an outline of a configuration and processing of the present disclosure.

Hereinafter, with reference to the drawings, an information processing apparatus, an information processing system, and an information processing method of the present disclosure will be described. Note that the description will be made in accordance with the following items.

1. About outline of configuration of present disclosure
2. About processing sequence of information processing system
2-A. (Processing example A) Processing example in which recognition target vehicle executes control on basis of recognition level notification from another car and infrastructure
2-B. (Processing example B) Processing example in which recognition execution vehicle executes control on basis of recognition level in recognition processing executed by own car
2-C. (Processing example C) Processing example in which recognition target vehicle executes control on basis of recognition level notification from infrastructure, and infrastructure executes control on basis of recognition level in recognition processing executed by infrastructure itself
2-D. (Processing example D) Processing example in which server calculates insurance premium for recognition target vehicle on basis of recognition level notification from vehicle and infrastructure, and further, recognition target vehicle executes control on basis of recognition level notification from server
3. About specific example of highly accurate calculation and notification processing of recognition level
3-(1). Reliable calculation and notification processing configuration of recognition level by using GPS information
3-(2). Reliable calculation and notification configuration example of recognition level by using reference marker of vehicle
4. About specific processing example
4-A. (Processing example A) About specific example of processing example in which recognition target vehicle executes control on basis of recognition level notification from another car and infrastructure
4-C. (Processing example C) About specific example of processing example in which recognition target vehicle executes control on basis of recognition level notification from infrastructure, and infrastructure executes control on basis of recognition level in recognition processing executed by infrastructure itself
5. About configuration example of vehicle control system
6. About configuration example of information processing apparatus
7. Summary of configuration of present disclosure

[1. About Outline of Configuration of Present Disclosure]

The present disclosure has a configuration of analyzing a recognition level of a vehicle to perform control according to an analysis result, for example, control for improvement of a recognition level, on the basis of information of communication between mobile devices such as vehicles or communication between a vehicle and an infrastructure system.

With reference to FIG. 1, a configuration example and an outline of processing of the present disclosure will be described.

FIG. 1 is a view illustrating a configuration example of an information processing system 1 of the present disclosure.

FIG. 1 illustrates a vehicle 10, a management server 20, and a roadside communication unit (RSU) 30 as a road infrastructure (road facility). These have a configuration enabling mutual communication via a network 40.

The vehicles 10 also include a conventional vehicle that travels by driving operation by a driver, and also an automatic driving vehicle that does not require driving operation by a driver.

Communication between vehicles is called vehicle-to-vehicle communication (V2V communication). Furthermore, communication between a vehicle and an infrastructure facility such as a roadside communication unit (RSU) is called vehicle-to-infrastructure communication (V2I communication). Furthermore, these are collectively called V2X communication. The V2X communication includes vehicle-to-vehicle, vehicle-to-infrastructure facility, vehicle-to-server communication, and the like.

The vehicle 10 shown in FIG. 1 is a vehicle that performs the V2X communication described above.

Each vehicle 10 performs transmission (multicast-transmission or the like) of vehicle information such as self-location information, a vehicle type and a vehicle size, and an identifier (ID), to other vehicles at any time or intermittently.

Note that the self-location information can be acquired by using location information acquired by using GPS, or a dynamic map (DM) provided by the management server 20.

The dynamic map (DM) is a map that reflects, on a map, traffic information that changes sequentially, such as traffic jam information and accident information, for example, in addition to static map information. The management server 20 uses information or the like received from vehicles and infrastructure facilities such as roadside communication units (RSUs), to generate, update, and store, in a storage unit, the dynamic map that prospers latest road conditions.

The dynamic map (DM) generated and updated by the management server 20 is provided to the vehicle 10, and the vehicle 10 can make determination or the like of an own location, a traveling path, and the like on the basis of this map. The automatic driving vehicle can select an optimum route and drive by referring to the dynamic map (DM).

Note that the vehicle 10 is mounted with a camera, and has a configuration of identifying a body (an object) such as an oncoming vehicle on a traveling path and performing control to avoid collision with the body.

Specifically, for example, in a case where the vehicle 10 is an automatic driving vehicle, the vehicle 10 controls a traveling direction and controls of stopping, decelerating, and the like, so as not to collide with the identified body. Furthermore, in a case of a vehicle driven by a driver, warning is made to the driver by displaying a body on a traveling path on a monitor that can be checked by the driver. For example, processing to call attention of the driver is performed by blinking the body display region, outputting an alarm sound, and the like.

In the configuration of the present disclosure, for example, in a case where an environment in which a certain vehicle is difficult to be recognized from another vehicle or the like occurs, control for improvement of a recognition rate is executed by controlling a recognition source vehicle, a recognition target vehicle, a surrounding infrastructure, and the like.

Moreover, calculation of the recognition level as a quantization value is enabled, objective determination of the recognition level is enabled, and control according to the calculated recognition level is executed. Furthermore, it is also possible to calculate an insurance premium or the like of a vehicle by using recognition level information.

In FIG. 1, the management server 20 performs setting notification and the like regarding functions such as recognition, feedback, and control, to each vehicle 10 and an infrastructure such as the roadside communication unit (RSU) 30. Furthermore, a function of calculating an insurance premium is also provided.

Each vehicle 10 recognizes other vehicles and an infrastructure such as the roadside communication unit (RSU) 30 by a sensor such as an image sensor (camera) or a radar, and travels so as not to collide with these. Furthermore, each vehicle 10 is a recognition target vehicle of another vehicle and an infrastructure such as the roadside communication unit (RSU) 30.

Each vehicle 10 and an infrastructure such as the roadside communication unit (RSU) 30 calculates a recognition level according to a recognition result of another vehicle and the like, and gives notification (feedback) of the calculated recognition level.

The vehicle executes vehicle control or the like according to the notified recognition result, and the infrastructure such as the roadside communication unit (RSU) 30 also performs control according to the notified recognition result, for example, processing such as increasing a recognition signal level for increasing a recognition level.

[2. About Processing Sequence of Information Processing System]

Next, a processing sequence involving communication executed between individual components of the information processing system 1 illustrated in FIG. 1 will be described.

The following four processing examples will be described in sequence.

(Processing example A) A processing example in which a recognition target vehicle executes control on the basis of recognition level notification from another car and an infrastructure (Processing example B) A processing example in which a recognition execution vehicle executes control on the basis of a recognition level in recognition processing executed by an own car (Processing example C) A processing example in which a recognition target vehicle executes control on the basis of recognition level notification from an infrastructure, and the infrastructure executes control on the basis of a recognition level in recognition processing executed by the infrastructure itself (Processing example D) A processing example in which a server calculates an insurance premium for a recognition target vehicle on the basis of recognition level notification from a vehicle and an infrastructure, and further, the recognition target vehicle executes control on the basis of recognition level notification from the server.

[2-A. (Processing Example A) Processing Example in which Recognition Target Vehicle Executes Control on Basis of Recognition Level Notification from Another Car and Infrastructure]

First, a description is given to, as (Processing example A), a processing example in which a recognition target vehicle executes control on the basis of recognition level notification from another car and an infrastructure.

A processing sequence of this Processing example A will be described with reference to a sequence diagram illustrated in FIG. 2.

In FIG. 2, from the left, the management server 20, a recognition target vehicle 50, a recognition execution vehicle 60, and a recognition execution infrastructure 70 are illustrated.

The management server 20 is the management server 20 illustrated in FIG. 1, and executes communication with each vehicle and the infrastructure, to perform, to each vehicle and the infrastructure such as a roadside communication unit (RSU), setting notification of an execution mode of recognition processing, notification of a recognition level calculation mode, and notification and setting of a notification mode of the recognition level and a control mode according to the recognition level.

Moreover, the management server 20 also executes calculation processing and the like of an insurance premium for a recognition target vehicle in accordance with a recognition level of the recognition target vehicle.

The recognition target vehicle 50 is a vehicle as a recognition target to be recognized by the recognition execution vehicle 60 and the recognition execution infrastructure 70.

The recognition execution vehicle 60 executes recognition processing of the recognition target vehicle 50. The recognition execution vehicle 60 executes recognition processing using sensors such as the image sensor (camera) and the radar and using communication information.

Note that the recognition execution vehicle 60 may be a plurality of vehicles.

The recognition execution infrastructure 70 executes recognition processing of the recognition target vehicle 50. The recognition execution infrastructure 70 executes recognition processing using sensors such as the image sensor (camera) and the radar and using communication information.

First, an outline of processing of this Processing example A will be described, and thereafter, details of processing of each step will be described.

In this Processing example A, the management server 20 gives notification to the recognition target vehicle 50, the recognition execution vehicle 60, and the recognition execution infrastructure 70 to detect a vehicle and calculate a recognition level. At this time, the notification is performed by wireless communication such as V2X. Note that this setting may be set in advance for each vehicle and/or infrastructure.

The recognition execution vehicle 60 and the recognition execution infrastructure 70 detect a vehicle and calculate a recognition level in accordance with notification information.

The recognition execution vehicle 60 and the recognition execution infrastructure 70 execute recognition processing of the recognition target vehicle 50 to calculate the recognition level, and then notify the recognition target vehicle 50 of a recognition level calculation result. This notification processing may be either direct communication or communication via the management server 20.

The recognition target vehicle 50 notified of the recognition level performs control as necessary, for example, driving-related control. For example, in a case where there is notification of a recognition level calculation result indicating that it is difficult to recognize a right side of a vehicle body, lane change or the like is executed so that the right side of the vehicle body can be more clearly recognized.

Note that the series of operations may be looped and continuously operated.

This is the outline of (Processing example A).

Next, details of processing of each step of the sequence diagram illustrated in FIG. 2 will be sequentially described.

(Step S11)

First, in step S11, the management server 20 notifies the recognition target vehicle 50, the recognition execution vehicle 60, and the recognition execution infrastructure 70 of each piece of the following information.

(a) Vehicle detection and recognition mode information (b) Recognition level calculation mode information (c) Recognition level notification mode information (d) Control mode information of a vehicle or an infrastructure (a) Vehicle detection and recognition mode information is, for example, information such as a type of a sensor to be used for vehicle detection, setting information of a parameter of the sensor, and a sensing time of a sensing region.

Types of sensors to be used include, for example, the following sensors.

An image sensor (camera), LiDAR, a millimeter wave radar, an ultrasonic sensor, and an acceleration/gyro sensor The management server 20 determines and notifies one or more sensors to be used from, for example, a group of these sensors.

Moreover, in step S11, the management server 20 may also notify of a condition for sensor switching.

For example, by defining weather information such as sunny, cloudy, rainy, and foggy in advance, sensor switching according to a weather change is performed.

(b) Recognition level calculation mode information is information indicating a specific recognition level calculation mode based on various types of sensor detection information.

For example, information such as: a recognition level calculation mode to which a captured image of the image sensor (camera) or the like is applied; and a recognition level calculation mode based on a detection result of a marker (reference marker) attached to the recognition target vehicle 50.

Furthermore, for example, likelihood information corresponding to various types of sensor detection information, the number of detected reference points set in advance for the recognition target vehicle 50, threshold value information for quantization of a recognition level, and the like may be notified.

(c) Recognition level notification mode information includes: a notification condition as to which recognition level value calculated by the recognition execution vehicle 60 and the recognition execution infrastructure 70 is to cause notification and as to how often the notification is given, to the recognition target vehicle 50; notification destination information indicating whether a notification destination is set to the recognition target vehicle 50 or the management server 20; and the like.

(d) Control mode information of a vehicle or an infrastructure is information regarding contents of control processing to be executed by the recognition target vehicle 50 that has received notification of a recognition level from the recognition execution vehicle 60 and the recognition execution infrastructure 70.

Moreover, control information of the recognition execution vehicle 60 and the recognition execution infrastructure 70 themselves may also be included.

For example, in accordance with an area (an expressway, an intersection, and the like), the management server 20 may change setting of the notification information described above, that is, the following notification information:

(a) vehicle detection and recognition mode information;

(b) recognition level calculation mode information;

(c) recognition level notification mode information; and (d) control mode information of a vehicle or an infrastructure, and give notification.

For example, in an area where a vehicle accident or the like has occurred, notification of optimum setting for the area is performed.

The management server 20 needs to recognize an environment in a target area. The management server 20 acquires environment information by using area information such as a 3D map and a dynamic map.

Note that the recognition target vehicle 50, the recognition execution vehicle 60, and the recognition execution infrastructure 70 may receive sensor switching information corresponding to weather or the like in advance from the management server 20, and thereafter, a sensor to be used may be determined on the basis of the weather information notified from the management server 20.

For example, the management server 20 notifies of setting information of a sensor to be used such that the sensor can be switched in accordance with the weather condition, such as using a millimeter wave radar in a case of fog.

Furthermore, in a case where object detection, distance measurement, and the like are performed, notification of priority setting may also be given from the management server 20, such as giving more importance at night to a processing result based on data of LiDAR, a millimeter wave radar, or an ultrasonic sensor than a processing result of the image sensor (visible light).

The management server 20 may have a configuration to switch and notify the sensor to be used in accordance with vehicle location information.

For example, a map is sectioned into specific zones, and the sensor to be used is switched in accordance with a zone in which the vehicle is present.

In this case, zone information of a map and sensor information used in the zone are defined in advance.

For example, in a case of a place where there are many guard rails on a road with many curves (for example, a mountain pass road) or a place where there is a metal gate at a position close to the road, a processing result of the image sensor is given more importance than a processing result of the millimeter wave radar.

The management server 20 can also notify of setting information of sensor parameters related to vehicle detection, in the notification processing in step S11.

For example, the following parameters are notified.

(P1) Parameters of the image sensor (camera)

(P2) Parameters of the radar

Specific examples of (P1) parameters of the image sensor will be described.

Parameters such as an angle of view, a resolution, and aperture of the image sensor are included.

Specific examples of the parameters to be set include the following.

(Example 1) An aperture parameter according to weather or a brightness.

(Example 2) A setting parameter of a processing target region (region of interest: ROI) in a curve.

(Example 3) A resolution parameter according to a speed

A setting example of the resolution parameter is, for example, setting to execute detection processing using a low-resolution image (a down-converted image) (a wide angle of view) during low-speed traveling of the vehicle, setting to execute detection processing using a resolution image (a relatively narrow angle of view) having the maximum capability of the image sensor during high-speed traveling, and the like.

Specific examples of (P2) parameters of the radar will be described.

Parameters related to an angle of view (field of view (FOV)), a resolution, a speed resolution, the number of antennas, a measurement distance, and the like are included.

For example, setting is changed in accordance with a processing target region (region of interest: ROI) in a curve.

Furthermore, setting is performed such as changing power of a transmitted radio wave in accordance with a traveling speed of the vehicle.

Specifically, in a case of high-speed traveling, radio wave output using normal electric power is executed to secure distant distance measurement performance. In a case of low-speed traveling, a low-power radio wave is used. In this case, although a measurement distance is shortened, power saving (longer battery life) can be achieved.

In the notification processing in step S11, the management server 20 further notifies of setting information of a detection time, a detection target area (a detection coverage, a distance, a sensing angle), and a target vehicle tracking time.

Moreover, the management server 20 also notifies of a notification mode when notifying (feedback notifying) the recognition target vehicle of a recognition level calculation result after vehicle detection in each vehicle and an infrastructure.

For example, a notification timing (trigger information), a notification cycle, and the like of notification information (feedback information) such as a recognition level are included.

Specifically, for example, setting is made such that the notification is performed only in a case where the recognition level is equal to or lower than a predetermined recognition level.

Moreover, the management server 20 also notifies of recognition level calculation mode information in the notification processing of step S11.

The recognition level is calculated by the each vehicle and infrastructure side, and is notified to the recognition target target vehicle and the server.

The management server 20 notifies the recognition execution vehicle 60 and/or the recognition execution infrastructure 70 that executes the recognition processing of a processing mode of recognition level calculation processing.

The recognition execution vehicle 60 and/or the recognition execution infrastructure 70 executes detection and recognition processing of the recognition target vehicle 50 by using a sensor such as a camera or a radar.

In the recognition level calculation processing using a sensor output, for example, processing using learning data is performed.

The recognition level is calculated from an output of each sensor with use of a result of learning processing executed in advance. Examples of the information used for the recognition level calculation include, for example, likelihood information corresponding to various types of sensor detection information, the number of detected reference points set in advance for the recognition target vehicle 50, and the like.

The management server 20 also provides a specific method of calculation processing of the recognition level with use of these pieces of information and provides threshold value information for quantization processing of the recognition level.

For example, in a case where processing of detecting a reference point attached to the vehicle is performed in the vehicle detection processing, the recognition level is calculated on the basis of a detection rate of the reference point.

The management server 20 provides a correspondence table (recognition level calculation table) between the reference point detection rate and the recognition level, and threshold value information for calculating the recognition level in accordance with the reference point detection rate. Furthermore, information for quantization of a recognition level may be provided.

As described above, in step S11, the management server 20 notifies the recognition target vehicle 50, the recognition execution vehicle 60, and the recognition execution infrastructure 70 of the following information.

(a) Vehicle detection and recognition mode information (b) Recognition level calculation mode information (c) Recognition level notification mode information (d) Control mode information of a vehicle or an infrastructure (Steps S12 and S13)

Next, in steps S12 and S13, the recognition execution vehicle 60 and the recognition execution infrastructure 70 execute the detection and recognition processing of the recognition target vehicle 50.

The recognition execution vehicle 60 and the recognition execution infrastructure 70 use a camera, a radar, and LiDAR as a sensor for the detection and recognition processing of the recognition target vehicle 50, V2X communication, and the like.

For example, detection of the entire vehicle or a part of the vehicle of the recognition target vehicle 50 is executed.

For example, a process of analyzing the number of detections, a detection rate, and the like of reference points including a marker and the like set in advance for the recognition target vehicle 50 is executed.

(Steps S14 and S15)

Next, in steps S14 and S15, the recognition execution vehicle 60 and the recognition execution infrastructure 70 execute the recognition level calculation processing from a detection and recognition result of the recognition target vehicle 50 obtained in steps S12 and S13.

The recognition level can be calculated, for example, using at least any of the following information.

(1) Detection information of each sensor and likelihood information of sensor detection information (2) Ratio information (a reference point detection rate) between the number of reference points set in the recognition target vehicle 50 and the number of reference points detected in the detection processing (3) Feature amount information of the recognition target vehicle obtained by a sensor These pieces of information are information that can be acquired in the detection processing of the recognition target vehicle in steps S12 and S13.

As the likelihood information corresponding to the sensor in "(1) detection information of each sensor and likelihood information of sensor detection information", one calculated using machine learning or the like may be used. As described above, the likelihood information corresponding to the sensor detection information is an index value indicating certainty of the sensor detection information. As this likelihood information, it is preferable to use likelihood information obtained as a result of learning processing in units of types of recognition objects such as cars, people, and infrastructures. Note that likelihood information obtained using two or more sensors may be used.

In a case of using "(2) ratio information (a reference point detection rate) between the number of reference points set in the recognition target vehicle 50 and the number of reference points detected in the detection processing", for example, the following processes are executed.

For example, a marker such as a QR code (registered trademark) is given to a part of the vehicle, and a detection result as to whether or not the information can be recognized is used.

In addition, a point with a predetermined color, a characteristic part of the target vehicle, or the like may be used as the reference point.

It is sufficient that a plurality of reference points is set in advance, and the recognition level is calculated using a ratio of the reference points that can be recognized among the plurality of reference points.

When the reference point is detected, detection using color information may be performed.

In a case of using "(3) feature amount information of the recognition target vehicle obtained by a sensor", for example, the recognition level is calculated using feature amount information obtained when the recognition target vehicle 50 is sensed by a sensor.

Next, a description is given to details of the recognition level calculation processing using the information described above, that is, (1) detection information of each sensor and likelihood information of sensor detection information, (2) ratio information (a reference point detection rate) between the number of reference points set in the recognition target vehicle 50 and the number of reference points detected in the detection processing, and (3) feature amount information of the recognition target vehicle obtained by a sensor.

Note that the recognition level to be calculated is preferably a quantized value.

In a case where the recognition level is calculated using "(1) detection information of each sensor and likelihood information of sensor detection information", the obtained likelihood information is quantized by a predetermined threshold value, and a quantization value of the recognition level is calculated.

For example, in a case where likelihood information of 0 to 1 is obtained as the likelihood information of the sensor detection information, a threshold value is set in units of 0.2 and quantized. Specifically, a quantization value of the recognition level is calculated as follows.

(1) In a case of likelihood information=0.8 to 1.0, recognition level=1 (recognition accuracy is high)

(2) In a case of likelihood information=0.6 to 0.8, recognition level=2

(3) In a case of likelihood information=0.4 to 0.6, recognition level=3

(4) In a case of likelihood information=0.2 to 0.4, recognition level=4

(5) In a case of likelihood information=0.0 to 0.2, recognition level=5 (recognition accuracy is low)

In a case where the recognition level is calculated using "(2) ratio information (a reference point detection rate) between the number of reference points set in the recognition target vehicle 50 and the number of reference points detected in the detection processing", the obtained ratio information is quantized by a predetermined threshold value, and a quantization value of the recognition level is calculated.

For example, when Y pieces (Y<=X) of reference point are detected for X pieces of reference point, the recognition level is calculated using Y/X.

The following examples are examples of a case of calculating the recognition level by calculating a detection rate as (%), that is, calculating (Y/X)×100.

(1) In a case of 100% to 80% detection, recognition level=1 (recognition accuracy is high)

(2) In a case of 80% to 40% detection, recognition level=2

(3) In a case of 40% to 15% detection, recognition level=3

(4) In a case of 15% to 0% (undetected), recognition level=4 (recognition accuracy is low)

In a case where a recognition level is calculated using "(3) feature amount information of the recognition target vehicle obtained by a sensor", an information amount of the obtained feature amount information is quantized by a predetermined threshold value, and a quantization value of the recognition level is calculated.

For example, the information amount of the feature amount information is divided by a predetermined threshold value and quantized.

Note that a recognition level of a vehicle may be calculated using one or more pieces of sensor detection information in combination.

For example, in a case of the recognition level 1 in a sensor 1 and the recognition level 2 in a sensor 2, the recognition level may be calculated using weight information (Weight) set in advance. For example, the recognition level is calculated according to the following expression.

$$\text{Recognition level} = \text{recognition level } 1 \times \text{Weight}\_A + \text{recognition level } 2 \times \text{Weight}\_B$$

Furthermore, the recognition level may be calculated after the sensor detection information itself is synthesized.

As described above, in steps S14 and S15, the recognition execution vehicle 60 and the recognition execution infrastructure 70 execute the recognition level calculation processing using the detection and recognition result of the recognition target vehicle 50 obtained in steps S12 and S13.

As described above, the calculated recognition level is, for example, a quantization value.

(Steps S16 and S17)

Next, in steps S16 and S17, the recognition execution vehicle 60 and the recognition execution infrastructure 70 notify (feedback notify) the recognition target vehicle 50 of a value of the recognition level calculated in steps S14 and S15.

The notification information also includes location information of the recognition execution vehicle 60 and the recognition execution infrastructure 70 and location information of the recognition target vehicle 50, in addition to a value of the recognition level calculated in steps S14 and S15.

This notification processing is executed, for example, through vehicle-to-vehicle direct communication or via the management server 20. Alternatively, multicast or broadcast transmission may be performed.

A surrounding vehicle that has received the notification information transmitted by multicast or broadcast selects information that matches an own car position, on the basis of location information of the recognition target vehicle 50 included in the notification information.

In a case where the notification is performed via the management server 20, on the basis of location information of the recognition target vehicle 50 included in notification information transmitted from the recognition execution vehicle 60 and the recognition execution infrastructure 70, the management server 20 specifies the recognition target vehicle 50 and transmits notification information to the specified recognition target vehicle 50.

Furthermore, in the notification processing of the recognition level for the recognition target vehicle 50, for example, in a case where the recognition level of the recognition target vehicle 50 is a dangerous level equal to or less than a predetermined threshold value, the fact that the recognition level is dangerous may be notified by causing a surrounding vehicle of the recognition target vehicle 50 to make a specific motion and causing the recognition target vehicle 50 to detect the specific motion, instead of the processing involving such communication processing.

For example, in a case where a surrounding vehicle starts meandering driving, this is to be the notification indicating that the recognition level of the recognition target vehicle 50 is equal to or less than a predetermined threshold value.

Furthermore, similarly, in a case where the recognition level of the recognition target vehicle 50 is a dangerous level equal to or less than a predetermined threshold value, operation equipment of a surrounding vehicle may be used to notify that the recognition target vehicle 50 is at a dangerous recognition level.

For example, it is notified that the recognition target vehicle 50 is at a dangerous recognition level when a light, a wiper, or the like of a surrounding vehicle is operated, and the recognition target vehicle 50 detects these operations.

Note that the notification processing of the recognition level for the recognition target vehicle 50 from the recognition execution vehicle 60 and the recognition execution infrastructure 70 in steps S16 and S17 is immediately executed after the recognition level calculation processing in steps S14 and S15.

However, in a case where the recognition level calculation processing in steps S14 and S15 is continuously executed, the notification is intermittently performed in accordance with a notification timing and a cycle that are set in advance.

Furthermore, a trigger for executing the notification may be defined in advance, and the notification may be performed in accordance with the trigger.

For example, the notification is performed at a predetermined position or zone such as an intersection or an expressway.

Furthermore, an execution frequency of the notification processing may also be changed depending on the position or the zone.

This notification mode is executed, for example, in accordance with the setting notified from the management server 20 in step S11.

The recognition level notification information notified from the recognition execution vehicle 60 and the recognition execution infrastructure 70 to the recognition target vehicle 50 also includes location information of a vehicle and an infrastructure in addition to the recognition level calculated in steps S14 and S15 as described above. Moreover, the following information may be included.

A used sensor, a measured time, a measured location, unrecognizable marker position information, and the like, and further, driving control information to be executed in accordance with the recognition level may also be included.

(Step S18)

Next, in step S18, the recognition target vehicle 50 that has received notification of a recognition level from the recognition execution vehicle 60 and the recognition execution infrastructure 70 in steps S16 and S17 executes necessary control in accordance with the received recognition level.

Specifically, in a case where the received recognition level is equal to or less than a predetermined threshold value, for example, the following processes are performed.

(a) Reducing a current traveling speed, and switching to slow driving. Alternatively, performing processing such as emergency stop.

(b) Turning on a light to improve the recognition level.

(c) Generating communication data including vehicle location information, vehicle speed information, vehicle size information, reference marker position information, and the like and transmitting to the surroundings.

For example, in a case where the recognition level is set such that the highest value is the recognition level=1 and the lowest value is the recognition level=5, when the recognition level of the lowest value=5 is inputted, at least any of the processes (a) to (c) described above is executed.

Alternatively, in a case where the recognition level=3 to 5 is inputted, at least any of the processes (a) to (c) described above is executed.

These control modes are notified in advance by the management server 20 in step S11.

As described above, in step S18, the recognition target vehicle 50 executes necessary control in accordance with the received recognition level. By performing this control, the recognition execution vehicle 60 can be easily recognized from the surrounding recognition execution vehicle 60 and/or recognition execution infrastructure 70. As a result, the possibility that the recognition execution vehicle 60 collides with the surrounding recognition execution vehicle 60 and/or recognition execution infrastructure 70 is reduced.

Note that the recognition target vehicle 50 receives the notification of the recognition level from the recognition execution vehicle 60 and the recognition execution infrastructure 70 in step S18. However, for example, in a case where there is a plurality of recognition execution vehicles 60, many different recognition levels are received.

When receiving one or more recognition levels from a plurality of vehicles and an infrastructure, the recognition target vehicle 50 may perform the following selection processing and integration processing of the recognition level to evaluate safety.

(a) Example of Selection Processing of Recognition Level

When receiving a plurality of recognition levels from a plurality of vehicles and an infrastructure, the recognition target vehicle 50 selects one recognition level and performs vehicle control using the recognition level.

For example, a process of prioritizing a recognition level received from a vehicle close to the recognition target vehicle 50 and discarding a recognition level of a vehicle having a long relative distance is performed.

(b) Example of Integration Processing of Recognition Level

When receiving a plurality of recognition levels from a plurality of vehicles and an infrastructure, the recognition target vehicle 50 integrates the plurality of recognition levels and performs vehicle control using the recognition level.

For example, an average of the plurality of recognition levels is taken.

Moreover, a large weight is applied to a value of a recognition level received from a vehicle close to the recognition target vehicle 50, and the value is preferentially reflected in the safety evaluation. Whereas, a final recognition level is calculated by executing arithmetic processing of reducing a weight of a recognition level received from a vehicle far from the recognition target vehicle 50.

By controlling the value of the weight in accordance with the relative distance, it is possible to strongly reflect a measurement result of a vehicle having a close relative distance. Similarly, a configuration may be adopted in which the weight is controlled not with a distance but with a difference of a measurer (a vehicle, an infrastructure, and the like).

[2-B. (Processing Example B) Processing Example in which Recognition Execution Vehicle Executes Control on Basis of Recognition Level in Recognition Processing Executed by Own Car]

Next, a description is given to (Processing example B), that is, a processing example in which a recognition execution vehicle executes control on the basis of a recognition level in recognition processing executed by an own car.

A processing sequence of this Processing example B will be described with reference to a sequence diagram illustrated in FIG. 3.

Figure 3:
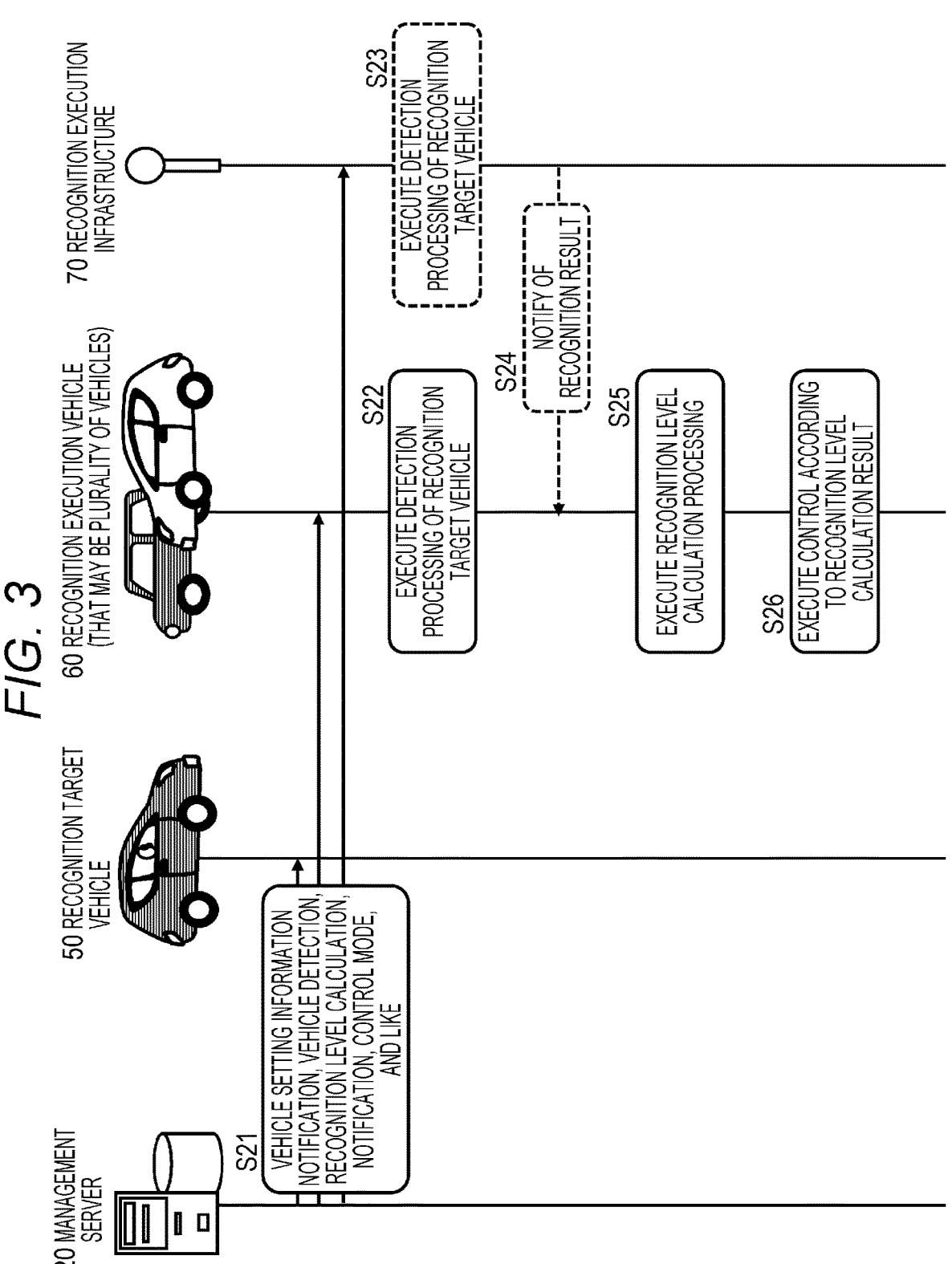
FIG. 3 is a diagram for explaining a processing sequence according to a second embodiment of the present disclosure.

In FIG. 3, similarly to FIG. 2 described above, from the left, the management server 20, the recognition target vehicle 50, the recognition execution vehicle 60, and the recognition execution infrastructure 70 are illustrated.

First, an outline of processing of this Processing example B will be described, and thereafter, details of processing of each step will be described.

In this Processing example B, the recognition execution vehicle 60 executes recognition processing of the recognition target vehicle 50, calculates a recognition level, and then executes control in accordance with the calculated recognition level.

For example, in a case where the recognition level is low, control is performed such as changing a sensor to be used for recognition or increasing detection accuracy of the sensor.

Note that the recognition execution infrastructure 70 may also execute recognition processing of the recognition target vehicle 50 and perform a process of notifying the recognition execution vehicle 60 of a recognition result.

By referring to the recognition result received from the recognition execution infrastructure 70 and comparing the recognition result with a confidence recognition result, the recognition execution vehicle 60 can check the self-recognition level more objectively, and can perform subsequent control with higher accuracy, that is, the control of changing the sensor to be used for recognition or increasing detection accuracy of the sensor.

Next, details of processing of each step of the sequence diagram illustrated in FIG. 3 will be sequentially described.

(Step S21)

First, in step S21, the management server 20 notifies the recognition target vehicle 50, the recognition execution vehicle 60, and the recognition execution infrastructure 70 of each piece of the following information.

(a) Vehicle detection and recognition mode information (b) Recognition level calculation mode information (c) Recognition level notification mode information (d) Control mode information of a vehicle or an infrastructure This processing is similar processing to the processing of step S11 described above with reference to FIG. 2.

(a) Vehicle detection and recognition mode information is, for example, information such as a type of a sensor to be used for vehicle detection, setting information of a parameter of the sensor, and a sensing time of a sensing region.

(b) Recognition level calculation mode information is information indicating a specific recognition level calculation mode based on various types of sensor detection information.

(c) Recognition level notification mode information includes: a notification condition as to which recognition level value calculated by the recognition execution vehicle 60 and the recognition execution infrastructure 70 is to cause notification to the recognition target vehicle 50; notification destination information indicating whether a notification destination is set to the recognition target vehicle 50 or the management server 20; and the like.

(d) Control mode information of a vehicle or an infrastructure is information regarding a mode of control processing to be executed by the recognition target vehicle 50 that has received notification of a recognition level from the recognition execution vehicle 60 and the recognition execution infrastructure 70.

Moreover, control information of the recognition execution vehicle 60 and the recognition execution infrastructure 70 themselves may also be included.

(Steps S22 and S23)

Next, in steps S22 and S23, the recognition execution vehicle 60 and the recognition execution infrastructure 70 execute detection and recognition processing of the recognition target vehicle 50.

Note that the detection and recognition processing of the recognition target vehicle 50 by the recognition execution vehicle 60 in step S22 is essential processing, but the detection and recognition processing of the recognition target vehicle 50 by the recognition execution infrastructure 70 in S23 may be omitted.

At least the recognition execution vehicle 60 executes the detection and recognition processing of the recognition target vehicle 50.

For example, the detection and recognition processing of the recognition target vehicle 50 is executed using a camera, a radar, and LiDAR as a sensor, V2X communication, and the like.

(Step S24)

In a case where the recognition execution infrastructure 70 executes the detection and recognition processing of the recognition target vehicle 50 in step S23, the recognition execution infrastructure 70 transmits a recognition result to the recognition execution vehicle 60 in step S24.

This recognition result transmission processing is executed by direct communication or communication via the management server 20.

(Step S25)

Next, in step S25, the recognition execution vehicle 60 executes recognition level calculation processing from a detection and recognition result of the recognition target vehicle 50 obtained in step S22.

Note that, in this processing, in a case where the recognition result has been received from the recognition execution infrastructure 70 in step S24, the processing may be executed using this received information as reference information.

The recognition level calculation processing is similar to the processing of steps S14 and S15 described above with reference to FIG. 2.

That is, for example, a recognition level is calculated using at least any of the following information.

(1) Detection information of each sensor and likelihood information of sensor detection information (2) Ratio information between the number of reference points set in the recognition target vehicle 50 and the number of reference points detected in the detection processing (3) Feature amount information of the recognition target vehicle obtained by a sensor These pieces of information are information that can be acquired in the detection processing of the recognition target vehicle in steps S12 and S13.

Note that the recognition level to be calculated is preferably a quantized value.

That is, for example, as the recognition level, a recognition level in which the highest value is the recognition level=1 and the lowest value is the recognition level=5 is calculated.

(Step S26)

Next, in step S26, the recognition execution vehicle 60 executes control processing according to a recognition level calculation value of the recognition target vehicle 50 obtained in step S25.

For example, in a case where the recognition level of the recognition target vehicle 50 obtained in step S25 is equal to or less than a predetermined threshold value, there are performed: a process of changing a type of a sensor to be used; and a process of improving a sensor detection level by executing changing of a parameter to be applied to recognition processing, output control of a used sensor, and the like.

Specifically, in a case where a sensor to be used in a case where the recognition level is equal to or less than a predetermined threshold value is an image sensor (camera), setting is made to use Lidar, a radar, a millimeter wave radar, or the like. Furthermore, a process such as turning on a light is performed.

[2-C. (Processing Example C) Processing Example in which Recognition Target Vehicle Executes Control on Basis of Recognition Level Notification from Infrastructure, and Infrastructure Executes Control on Basis of Recognition Level in Recognition Processing Executed by Infrastructure Itself]

Next, a description is given to (Processing example C), that is, a processing example in which a recognition target vehicle executes control on the basis of recognition level notification from an infrastructure, and the infrastructure executes control on the basis of a recognition level in recognition processing executed by the infrastructure itself.

A processing sequence of this Processing example C will be described with reference to a sequence diagram illustrated in FIG. 4.

Figure 4:
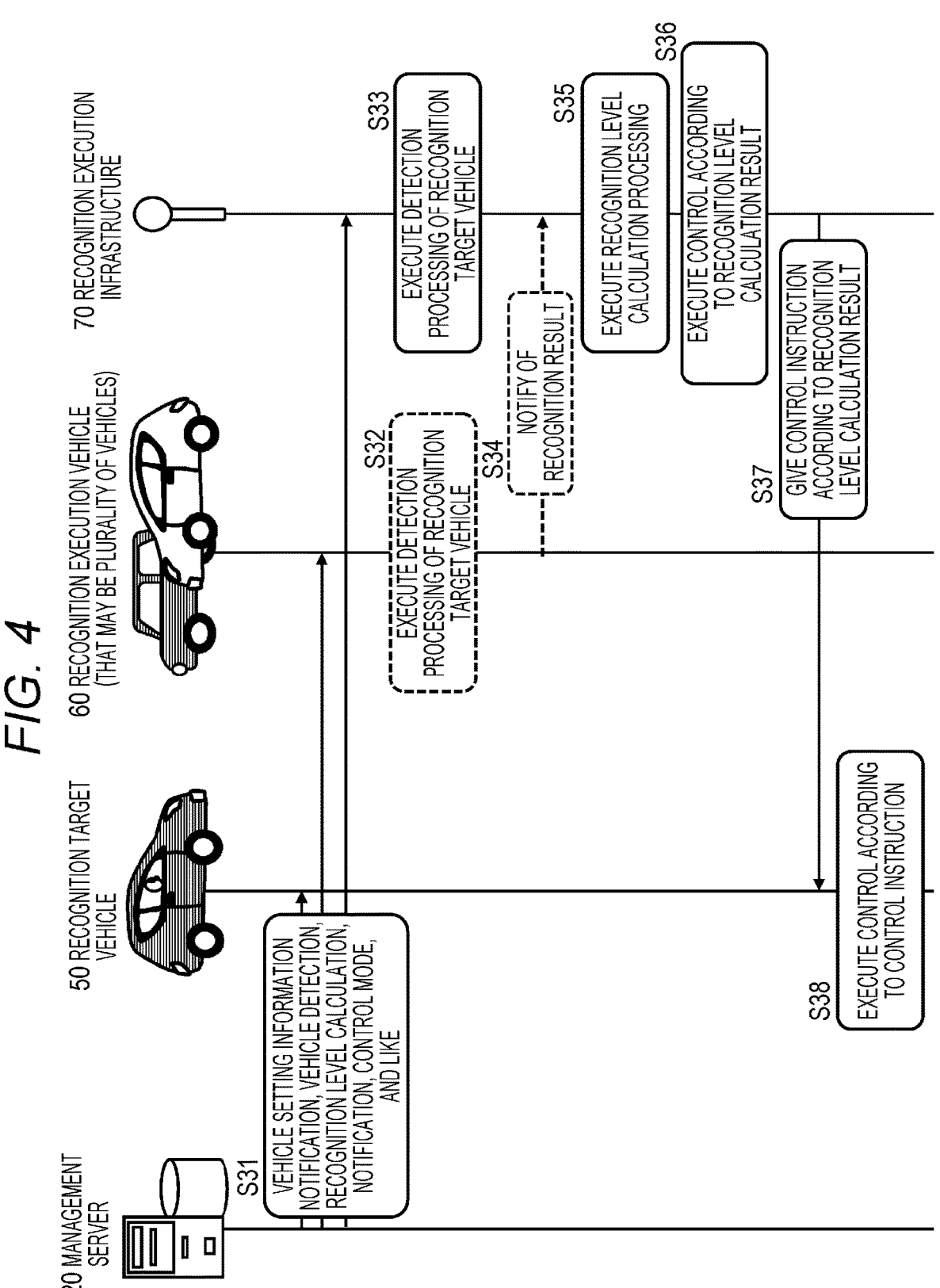
FIG. 4 is a diagram for explaining a processing sequence according to a third embodiment of the present disclosure.

In FIG. 4, similarly to FIG. 2 described above, from the left, the management server 20, the recognition target vehicle 50, the recognition execution vehicle 60, and the recognition execution infrastructure 70 are illustrated.

First, an outline of processing of this Processing example C will be described, and thereafter, details of processing of each step will be described.

In this Processing example C, the recognition execution infrastructure 70 such as a roadside communication unit (RSU) executes recognition processing of the recognition target vehicle 50, calculates a recognition level, and then executes control of the recognition execution infrastructure 70 itself in accordance with the calculated recognition level.

For example, in a case where the recognition level is low, control is performed such as changing a sensor to be used for recognition or increasing detection accuracy of the sensor. For example, in a case where the infrastructure is a street lamp facility, control such as increasing a brightness of the street lamp and changing a direction is performed.

Moreover, in this Example C, in a case where the calculated recognition level is equal to or less than a predetermined threshold value, the recognition execution infrastructure 70 instructs the recognition execution vehicle 60 to perform control for increasing the recognition level.

For example, a control instruction is transmitted to: reduce a traveling speed; turn on a light for improving the recognition level; and transmit communication data including vehicle location information, vehicle speed information, vehicle size information, reference marker position information, and the like.

The recognition execution vehicle 60 executes control according to the control instruction received from the recognition execution infrastructure 70.

Next, details of processing of each step of the sequence diagram illustrated in FIG. 4 will be sequentially described.
(Step S31)

First, in step S31, the management server 20 notifies the recognition target vehicle 50, the recognition execution vehicle 60, and the recognition execution infrastructure 70 of each piece of the following information.

(a) Vehicle detection and recognition mode information
(b) Recognition level calculation mode information
(c) Recognition level notification mode information
(d) Control mode information of a vehicle or an infrastructure This processing is similar processing to the processing of step S11 described above with reference to FIG. 2.

(a) Vehicle detection and recognition mode information is, for example, information such as a type of a sensor to be used for vehicle detection, setting information of a parameter of the sensor, and a sensing time of a sensing region.

(b) Recognition level calculation mode information is information indicating a specific recognition level calculation mode based on various types of sensor detection information.

(c) Recognition level notification mode information includes: a notification condition as to which recognition level value calculated by the recognition execution vehicle 60 and the recognition execution infrastructure 70 is to cause notification to the recognition target vehicle 50; notification destination information indicating whether a notification destination is set to the recognition target vehicle 50 or the management server 20; and the like.

(d) Control mode information of a vehicle or an infrastructure is information regarding a mode of control processing to be executed by the recognition target vehicle 50 that has received notification of a recognition level from the recognition execution vehicle 60 and the recognition execution infrastructure 70.

Moreover, control information of the recognition execution vehicle 60 and the recognition execution infrastructure 70 themselves may also be included.
(Steps S32 and S33)

Next, in steps S32 and S33, the recognition execution vehicle 60 and the recognition execution infrastructure 70 execute detection and recognition processing of the recognition target vehicle 50.

Note that, in the present embodiment, the detection and recognition processing of the recognition target vehicle 50 by the recognition execution infrastructure 70 in S33 is essential, but the detection and recognition processing of the recognition target vehicle 50 by the recognition execution vehicle 60 in step S32 may be omitted.

At least the recognition execution infrastructure 70 executes the detection and recognition processing of the recognition target vehicle 50.

For example, the detection and recognition processing of the recognition target vehicle 50 is executed using a camera, a radar, and LiDAR as a sensor, V2X communication, and the like.
(Step S34)

In a case where the recognition execution vehicle 60 executes the detection and recognition processing of the recognition target vehicle 50 in step S32, the recognition execution vehicle 60 transmits a recognition result to the recognition execution infrastructure 70 in step S34.

This recognition result transmission processing is executed by direct communication or communication via the management server 20.
(Step S35)

Next, in step S35, the recognition execution infrastructure 70 executes recognition level calculation processing from a detection and recognition result of the recognition target vehicle 50 obtained in step S33.

Note that, in this processing, in a case where the recognition result has been received from the recognition execution vehicle 60 in step S34, the processing may be executed using this received information as reference information.

The recognition level calculation processing is similar to the processing of steps S14 and S15 described above with reference to FIG. 2.

That is, for example, a recognition level is calculated using at least any of the following information.

(1) Detection information of each sensor and likelihood information of sensor detection information
(2) Ratio information between the number of reference points set in the recognition target vehicle 50 and the number of reference points detected in the detection processing
(3) Feature amount information of the recognition target vehicle obtained by a sensor These pieces of information are information that can be acquired in the detection processing of the recognition target vehicle in steps S12 and S13.

Note that the recognition level to be calculated is preferably a quantized value.

That is, for example, as the recognition level, a recognition level in which the highest value is the recognition level=1 and the lowest value is the recognition level=5 is calculated.
(Step S36)

Next, in step S36, the recognition execution infrastructure 70 executes control processing according to a recognition level calculation value of the recognition target vehicle 50 obtained in step S35.

For example, in a case where the recognition level of the recognition target vehicle 50 obtained in step S35 is equal to or less than a predetermined threshold value, as the control for increasing the recognition level, control for increasing a brightness of output light of the recognition execution infrastructure 70, control for changing a light projection direction, and the like are performed. Furthermore, a process of changing a type of a sensor to be used and a process of improving a sensor detection level by controlling output of the sensor to be used are performed.

Specifically, in a case where a sensor to be used in a case where the recognition level is equal to or less than a predetermined threshold value is an image sensor (camera), setting is made to use Lidar, a radar, a millimeter wave radar, or the like. Furthermore, processing such as turning on of a light, illuminance change, and light projection direction change is performed.

(Step S37)

Moreover, in a case where the calculated recognition level is equal to or less than a predetermined threshold value, the recognition execution infrastructure 70 instructs the recognition target vehicle 50 to perform control for increasing the recognition level.

For example, the following instruction is performed.

For example, a control instruction is transmitted to perform the following processes:

reducing a traveling speed;

turning on a light to improve the recognition level; and transmitting communication data including vehicle location information, vehicle speed information, vehicle size information, reference marker position information, and the like.

Note that this control instruction may be directly executed from the recognition execution infrastructure 70 to the recognition execution vehicle 60, or the recognition execution infrastructure 70 may be configured to request the management server 20 to transmit the control instruction to the recognition target vehicle 50.

The management server 20 transmits the control instruction to the recognition execution vehicle 60 in response to the request from the recognition execution infrastructure 70.

Furthermore, in this case, the recognition execution infrastructure 70 may request the management server 20 to change a value such as a parameter of the sensor.

As described above, while the management server 20 notifies each vehicle of, for example, a type of a sensor to be used for vehicle detection, setting information of a parameter of the sensor, and the like in step S31, the recognition execution infrastructure 70 requests the management server 20 to change these pieces of setting information.

In response to the request from the recognition execution infrastructure 70, the management server 20 changes the type of the sensor to be used for vehicle detection, setting information of the parameter of the sensor, and the like, and notifies each vehicle and/or the infrastructure.

(Step S38)

Next, in step S38, the recognition target vehicle 50 executes control in accordance with the control instruction from the recognition execution infrastructure 70.

Specifically, for example, the following processes are performed in accordance with the control instruction from the recognition execution infrastructure 70.

(a) Reducing a current traveling speed, and switching to slow driving. Alternatively, performing processing such as emergency stop.

(b) Turning on a light to improve the recognition level.

(c) Generating communication data including vehicle location information, vehicle speed information, vehicle size information, reference marker position information, and the like and transmitting to the surroundings.

[2-D. (Processing Example D) Processing Example in which Server Calculates Insurance Premium for Recognition Target Vehicle on Basis of Recognition Level Notification from Vehicle and Infrastructure, and Further, Recognition Target Vehicle Executes Control on Basis of Recognition Level Notification from Server]

Next, a description is given to (Processing example D), that is, a processing example in which a server calculates an insurance premium for a recognition target vehicle on the basis of recognition level notification from a vehicle and an infrastructure, and further, the recognition target vehicle executes control on the basis of recognition level notification from the server.

A processing sequence of this Processing example D will be described with reference to a sequence diagram illustrated in FIG. 5.

Figure 5:
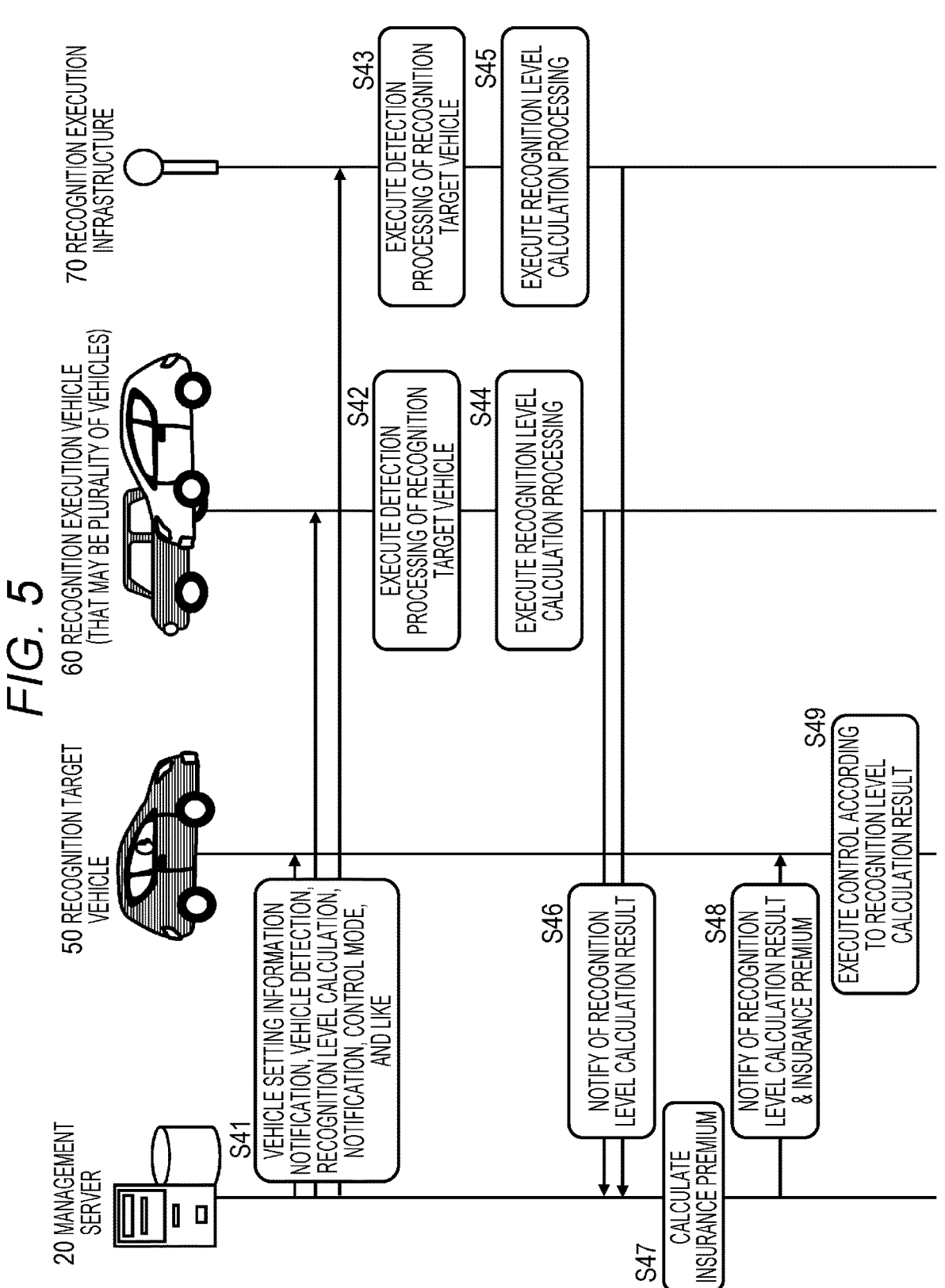
FIG. 5 is a diagram for explaining a processing sequence according to a fourth embodiment of the present disclosure.

In FIG. 5, similarly to FIG. 2 described above, from the left, the management server 20, the recognition target vehicle 50, the recognition execution vehicle 60, and the recognition execution infrastructure 70 are illustrated.

First, an outline of processing of this Processing example D will be described, and thereafter, details of processing of each step will be described.

In this Processing example D, the management server 20 calculates an insurance premium for the recognition target vehicle 50 in accordance with a recognition level of the recognition target vehicle 50.

In this Processing example D, after calculating the recognition level of the recognition target vehicle 50, the recognition execution vehicle 60 and the recognition execution infrastructure 70 notify the management server 20 of the recognition level. With reference to the recognition level received from the recognition execution vehicle 60 and the recognition execution infrastructure 70, the management server 20 notifies of the insurance premium for the recognition target vehicle 50. By the management server 20 being notified of the recognition level, the management server 20 can obtain an evaluation result such as how easily the recognition target vehicle 50 is recognized from an another vehicle and/or infrastructure side.

The management server 20 changes the insurance premium in accordance with the recognition level. In a case where it is determined that the vehicle has a low recognition level and is difficult to be recognized, measures such as raising the insurance premium are taken.

Furthermore, after the insurance premium is calculated, the recognition target vehicle 50 may be notified of an insurance premium calculation result as feedback. The recognition target vehicle 50 may perform driving control in response to the reception of the notification of the insurance premium calculation result.

Next, details of processing of each step of the sequence diagram illustrated in FIG. 5 will be sequentially described.

(Step S41)

First, in step S41, the management server 20 notifies the recognition target vehicle 50, the recognition execution vehicle 60, and the recognition execution infrastructure 70 of each piece of the following information.

(a) Vehicle detection and recognition mode information (b) Recognition level calculation mode information (c) Recognition level notification mode information (d) Control mode information of a vehicle or an infrastructure This processing is similar processing to the processing of step S11 described above with reference to FIG. 2.

(a) Vehicle detection and recognition mode information is, for example, information such as a type of a sensor to be used for vehicle detection, setting information of a parameter of the sensor, and a sensing time of a sensing region.

(b) Recognition level calculation mode information is information indicating a specific recognition level calculation mode based on various types of sensor detection information.

(c) Recognition level notification mode information includes: a notification condition as to which recognition level value calculated by the recognition execution vehicle 60 and the recognition execution infrastructure 70 is to cause notification to the recognition target vehicle 50; notification destination information indicating whether a notification destination is set to the recognition target vehicle 50 or the management server 20; and the like.

(d) Control mode information of a vehicle or an infrastructure is information regarding a mode of control processing to be executed by the recognition target vehicle 50 that has received notification of a recognition level from the recognition execution vehicle 60 and the recognition execution infrastructure 70.

Moreover, control information of the recognition execution vehicle 60 and the recognition execution infrastructure 70 themselves may also be included.

(Steps S42 and S43)

Next, in steps S442 and S43, the recognition execution vehicle 60 and the recognition execution infrastructure 70 execute detection and recognition processing of the recognition target vehicle 50.

For example, the detection and recognition processing of the recognition target vehicle 50 is executed using a camera, a radar, and LiDAR as a sensor, V2X communication, and the like.

(Steps S44 and S45)

Next, in steps S44 and S45, the recognition execution vehicle 60 and the recognition execution infrastructure 70 execute recognition level calculation processing from a detection and recognition result of the recognition target vehicle 50 obtained in steps S42 and S43.

The recognition level calculation processing is similar to the processing of steps S14 and S15 described above with reference to FIG. 2.

That is, for example, a recognition level is calculated using at least any of the following information.

(1) Detection information of each sensor and likelihood information of sensor detection information (2) Ratio information between the number of reference points set in the recognition target vehicle 50 and the number of reference points detected in the detection processing (3) Feature amount information of the recognition target vehicle obtained by a sensor These pieces of information are information that can be acquired in the detection processing of the recognition target vehicle in steps S12 and S13.

Note that the recognition level to be calculated is preferably a quantized value.

That is, for example, as the recognition level, a recognition level in which the highest value is the recognition level=1 and the lowest value is the recognition level=5 is calculated.

(Step S46)

Next, in step S46, the recognition execution vehicle 60 and the recognition execution infrastructure 70 notify (feedback notify) the management server 20 of a value of the recognition level calculated in steps S44 and S45.

(Step S47)

Next, in step S47, the management server 20 calculates an insurance premium for the recognition target vehicle 50 on the basis of a value of the recognition level received from the recognition execution vehicle 60 and the recognition execution infrastructure 70.

The management server 20 can obtain an evaluation result such as how easily the recognition target vehicle 50 is recognized from an another vehicle and/or infrastructure side on the basis of a value of the recognition level received from the recognition execution vehicle 60 and the recognition execution infrastructure 70.

The management server 20 changes the insurance premium in accordance with the recognition level. In a case where it is determined that the vehicle has a low recognition level and is difficult to be recognized, measures such as raising the insurance premium are taken.

Specifically, for example, in a case where a recognition level of a predetermined value or less is reported from X % or more of vehicles, insurance premium change processing such as increasing the insurance premium by Y % is executed.

Note that, in calculating the insurance premium, not only the recognition level but also a sensor used in the vehicle detection, a measurement time, a measurement location, marker position information that cannot be recognized, and the like may be considered.

(Step S48)

Next, in step S48, the management server 20 notifies the recognition target vehicle 50 of a value of the recognition level received from the recognition execution vehicle 60 and the recognition execution infrastructure 70, and the insurance premium calculated in the management server 20.

(Step S49)

Next, in step S49, the recognition target vehicle 50 executes necessary control in accordance with the received recognition level.

Specifically, in a case where the received recognition level is equal to or less than a predetermined threshold value, for example, the following processes are performed.

(a) Reducing a current traveling speed, and switching to slow driving. Alternatively, performing processing such as emergency stop.

(b) Turning on a light to improve the recognition level.

(c) Generating communication data including vehicle location information, vehicle speed information, vehicle size information, reference marker position information, and the like and transmitting to the surroundings.

For example, in a case where a recognition level in which the highest value is the recognition level=1 and the lowest value is the recognition level=5 has been calculated as the recognition level, when the lowest value of the recognition level=5 is inputted, at least any of the processes (a) to (c) described above is executed.

[3. About Specific Example of Highly Accurate Calculation and Notification Processing of Recognition Level]

As described with reference to FIGS. 2 to 5, the recognition execution vehicle 60 and/or the recognition execution infrastructure 70 calculates the recognition level of the recognition target vehicle 50, and notifies the recognition target vehicle 50 and the management server 20 of the calculated recognition level.

Alternatively, control of the recognition execution vehicle 60 and/or the recognition execution infrastructure 70 itself is executed in accordance with the calculated recognition level.

For the recognition level on which such control is based, reliable calculation processing and reliable notification processing are required to be performed.

A description is given to, for example, a configuration example in which the recognition execution vehicle 60 and/or the recognition execution infrastructure 70 reliably calculates a recognition level and reliably notifies the recognition target vehicle 50 of the recognition level. A plurality of processing examples will be described below.

(1) Reliable calculation and notification processing configuration of recognition level by using GPS information (2) Reliable calculation and notification configuration of recognition level by using reference marker of vehicle

[3-(1). Reliable Calculation and Notification Processing Configuration of Recognition Level by Using GPS Information]

First, a description is given to a configuration example in which the recognition execution vehicle 60 and/or the recognition execution infrastructure 70 reliably calculates a recognition level by using GPS information and reliably notifies the recognition target vehicle 50.

In this configuration, each vehicle acquires location information of its own vehicle with respect to surrounding vehicles in advance on the basis of GPS information, and broadcasts the acquired location information together with vehicle ID information.

The recognition execution vehicle 60 and/or the recognition execution infrastructure 70 uses its own location information acquired on the basis of the GPS information and the location information of the recognition target vehicle 50 received from the recognition target vehicle 50, to check a relative positional relationship between the recognition target vehicle 50 and the recognition execution vehicle 60 and/or the recognition execution infrastructure 70.

The recognition execution vehicle 60 and/or the recognition execution infrastructure 70 uses the relative positional relationship information to calculate a highly accurate recognition level of the recognition target vehicle 50. Moreover, the recognition execution vehicle 60 and/or the recognition execution infrastructure 70 can reliably transmit the calculated recognition level to the recognition target vehicle 50 by using the relative positional relationship information.

Moreover, the management server 20 may be notified of the GPS location information acquired by each vehicle, and the management server 20 may create a 3D map in which each vehicle position is recorded on the basis of the location information of each vehicle, to transmit to each vehicle and/or infrastructure.

In this case, the recognition execution vehicle 60 and/or the recognition execution infrastructure 70 can reliably know the position of the recognition execution vehicle 60 by using the 3D map in which the location information of individual vehicles including the recognition execution vehicle 60 is mapped.

By calculating the recognition level for the vehicle whose vehicle position is specified in this manner, more accurate recognition level calculation processing and recognition level notification processing can be performed.

[3-(2). Reliable Calculation and Notification Configuration Example of Recognition Level by Using Reference Marker of Vehicle]

Next, a description is given to a configuration example in which the recognition execution vehicle 60 and/or the recognition execution infrastructure 70 reliably calculates a recognition level by using a reference marker of the recognition target vehicle 50 and reliably notifies the recognition target vehicle 50.

In this configuration, the vehicle ID information is embedded in the reference marker of the recognition target vehicle 50. In the recognition target vehicle 50, a reference marker is attached, to the vehicle, in which vehicle ID information is recorded in code information such as, for example, a QR code (registered trademark).

The recognition execution vehicle 60 and/or the recognition execution infrastructure 70 can capture an image of the reference marker of the recognition target vehicle 50 with a sensor such as a camera, and acquire the vehicle ID of the recognition target vehicle 50.

After calculating the recognition level of the recognition target vehicle 50, the recognition execution vehicle 60 and/or the recognition execution infrastructure 70 transmits the calculated recognition level to the recognition target vehicle 50. In this transmission processing, it becomes possible to determine a transmission destination on the basis of the vehicle ID of the recognition target vehicle 50, and it becomes possible to reliably notify of the calculated recognition level.

[4. About Specific Processing Example]

Next, a specific processing example to which processing of the present disclosure is applied will be described.

The following four types of processing examples have been described with reference to FIGS. 2 to 5.

(Processing example A) A processing example in which a recognition target vehicle executes control on the basis of recognition level notification from another car and an infrastructure (Processing example B) A processing example in which a recognition execution vehicle executes control on the basis of a recognition level in recognition processing executed by an own car (Processing example C) A processing example in which a recognition target vehicle executes control on the basis of recognition level notification from an infrastructure, and the infrastructure executes control on the basis of a recognition level in recognition processing executed by the infrastructure itself (Processing example D) A processing example in which a server calculates an insurance premium for a recognition target vehicle on the basis of recognition level notification from a vehicle and an infrastructure, and further, the recognition target vehicle executes control on the basis of recognition level notification from the server.

Specific processing examples of (Processing example A) and (Processing example C) among the four processing examples described above will be sequentially described below.

[4-A. (Processing Example A) about Specific Example of Processing Example in which Recognition Target Vehicle Executes Control on Basis of Recognition Level Notification from Another Car and Infrastructure]

First, a description is given to a specific example of (Processing example A), that is, a processing example in which a recognition target vehicle executes control on the basis of recognition level notification from another car and an infrastructure.

In this Processing example A, the management server 20 gives notification to the recognition target vehicle 50, the recognition execution vehicle 60, and the recognition execution infrastructure 70 for detection of a vehicle and calculation of a recognition level.

Thereafter, the recognition execution vehicle 60 and the recognition execution infrastructure 70 detect a vehicle and calculate a recognition level in accordance with notification information.

Moreover, the recognition execution vehicle 60 and the recognition execution infrastructure 70 notify the recognition target vehicle 50 of a recognition level calculation result.

The recognition target vehicle 50 notified of the recognition level performs driving-related control, as necessary.

This is the outline of (Processing example A).

Hereinafter, a specific example of this (Processing example A) will be described.

(Step S11)

First, in step S11, the management server 20 notifies each vehicle of setting for vehicle detection and recognition level calculation, by using cellular communication.

The management server 20 notifies the recognition execution vehicle 60 and the recognition execution infrastructure 70 to use an image sensor as a sensor to be used, and to use a radar in combination in a case where fog is strong.

Note that the this processing example will be described as an example in which there are one recognition target vehicle 50, two recognition execution vehicles, a recognition execution vehicle A, 60A and a recognition execution vehicle B, 60B.

The management server 20 transmits, to the two recognition execution vehicles A, 60A and B, 60B, an instruction for a sensing region so as to individually sense an area of surroundings of 300 m.

(Steps S12, S14, and S16)

Next, a description is given to processing executed by the two recognition execution vehicles A, 60A and B, 60B, that is, (step S12) detection and recognition processing of the recognition target vehicle 50, (step S14) recognition level calculation processing of the recognition target vehicle 50, and (step S16) recognition level notification processing for the recognition target vehicle 50.

The recognition execution vehicle A executes captured image analysis by using the image sensor (camera), as vehicle detection processing. The vehicle detection is performed on a captured image by using machine learning data.

Moreover, a recognition level of the vehicle is calculated using likelihood information acquired from a result of learning executed in advance.

For each vehicle, correspondence data between the likelihood information acquired from a result of learning executed in advance and a recognition level, that is, a "likelihood correspondence recognition level calculation table" has been provided from the management server 20, and stored in a storage unit. For example, the table is as follows.

In a case of likelihood information=0.8 to 1.0, recognition level=1 (recognition accuracy is high)

In a case where likelihood information=0.6 to 0.8, recognition level=2

In a case of likelihood information=0.4 to 0.6, recognition level=3

In a case of likelihood information=0.2 to 0.4, recognition level=4

In a case of likelihood information=0.0 to 0.2, recognition level=5 (recognition accuracy is low)

The recognition execution vehicle A calculates likelihood information=0.3 by the captured image analysis using the image sensor (camera), and calculates the recognition level=4 using the table described above.

Setting is performed in advance on the recognition execution vehicle A so as to

"perform feedback on the recognition target vehicle 50 at the recognition level 3 or higher"

from the management server 20.

On the basis of this setting, the recognition execution vehicle A executes notification of the recognition level=4 to the recognition target vehicle 50.

Whereas, the recognition execution vehicle B, 60B is notified from the management server 20 to measure, as a reference marker, a red sticker attached to the recognition target vehicle 50 in advance, as detection of a vehicle. The reference markers are attached at a plurality of places, for example, 10 places on a rear side of the vehicle recognition target vehicle 50.

The recognition execution vehicle B, 60B is also notified of a size of the marker and a recognition level calculation mode according to the presence or absence of detection of each size, from the management server 20.

The reference marker, which is the red sticker attached to the recognition target vehicle 50, has:

three types of surface areas of 1, 5, and 10, and in a case where the detection of the marker of each surface area is successful, the following recognition level is set.

The notification is given from the management server 20 to calculate a recognition level as follows:

recognition level 1 in a case of successful marker detection with the surface area=1, recognition level 2 in a case of successful marker detection with the surface area=5, and recognition level 3 in a case of successful marker detection with the surface area=10.

Further, the recognition execution vehicle B, 60B is set to calculate a final recognition level=3 in a case where a detection success rate of the marker with the surface area=1 or 5 is 50% or less.

The recognition execution vehicle B, 60B is set to notify the recognition target vehicle 50 of the notification of the recognition level in a case where the final recognition level=3 or less, from the management server 20.

According to this setting, the recognition execution vehicle B, 60B has performed sensing of the surroundings of 300 m, found one recognition target vehicle 50, and calculated a recognition level, and the recognition level has been 3. Since the notification condition is met, notification of the calculated recognition level=3 is executed for the recognition target vehicle 50.

(Step S18)

The recognition target vehicle 50 receives notification of two recognition levels from the recognition execution vehicle A, 60A and the recognition execution vehicle B, 60B, and receives two types of recognition level notification of the recognition level=4 and the recognition level=3.

In a case where notification of two or more recognition levels are received, the recognition target vehicle 50 executes an arithmetic operation for integrating these, to perform final recognition level calculation.

The arithmetic operation for the integration processing is executed by weighting addition arithmetic operation in which each recognition level is multiplied by a weight corresponding to a distance between the own vehicle and the recognition executer usage, and added.

The fact that: an inter-vehicle distance between the recognition target vehicle 50 and the recognition execution vehicle A, 60A=50 m; and an inter-vehicle distance between the recognition target vehicle 50 and the recognition execution vehicle B, 60B=100 m, is already acquired from the 3D map in which the vehicle position received from the management server 20 is recorded.

Since the inter-vehicle distance from the recognition execution vehicle A, 60A is ½ of the inter-vehicle distance from the recognition execution vehicle B, 60B, the final recognition level is calculated by setting the calculated recognition level=4 of the recognition execution vehicle A, 60A to twice the calculated recognition level=3 of the recognition execution vehicle B, 60B.

The weighting addition arithmetic operation, which is a final recognition level value calculation expression in which the weight according to the distance is set, is expressed by the following (Expression 1).

$$\text{Final recognition level}=4\times(\tfrac{2}{3})+3\times(\tfrac{1}{3})\approx3.7$$

It is assumed that, in (step S11), the management server 20 instructs the recognition target vehicle 50 to perform control for improvement of the recognition level in a case where the recognition level is 4 or less.

Since the calculated final recognition level=3.7 is 4 or less, the recognition target vehicle 50 performs control for improvement of the recognition level.

For example, the recognition target vehicle 50 has made a lane change and moved to a central portion of a road. Furthermore, in order to enable easy detection even at night, control is performed to turn on a rear side light to enable the reference marker to be easily recognized.

Thereafter, the recognition execution vehicle A, 60A and the recognition execution vehicle B, 60B execute the detection and the recognition level calculation again of the recognition target vehicle 50. As a result, the recognition levels calculated by the recognition execution vehicle A, 60A and the recognition execution vehicle B, 60B are all 4 or more, and it is determined that the recognition level notification to the recognition target vehicle 50 is unnecessary.

[4-C. (Processing Example C) about Specific Example of Processing Example in which Recognition Target Vehicle Executes Control on Basis of Recognition Level Notification from Infrastructure, and Infrastructure Executes Control on Basis of Recognition Level in Recognition Processing Executed by Infrastructure Itself]

Next, a description is given to a specific example of a processing example (Processing example C), that is, (Processing example C) in which a recognition target vehicle executes control on the basis of recognition level notification from an infrastructure, and the infrastructure executes control on the basis of a recognition level in recognition processing executed by the infrastructure itself.

In this Processing example C, the recognition execution infrastructure 70 such as a roadside communication unit (RSU) executes recognition processing of the recognition target vehicle 50, calculates a recognition level, and then executes control of the recognition execution infrastructure 70 itself in accordance with the calculated recognition level.

Furthermore, in a case where the calculated recognition level is equal to or less than a predetermined threshold value, the recognition execution infrastructure 70 instructs the recognition execution vehicle 60 to perform control for increasing the recognition level.

This is the outline of (Processing example C).

Hereinafter, a specific example of this (Processing example C) will be described.

(Step S31)

First, in step S31, the management server 20 notifies each vehicle of setting for vehicle detection and recognition level calculation, by using cellular communication.

The management server 20 notifies the recognition execution vehicle 60 and the recognition execution infrastructure 70 to use an image sensor as a sensor to be used, and to use a radar in combination in a case where fog is strong.

The recognition execution vehicle 60 has been instructed to sense an area of surroundings of 500 m when entering a specific area (highway), and notified to measure a license plate as a reference marker, as detection of a vehicle.

The management server 20 has further been instructed to notify the recognition execution vehicle 60 of a license plate number of the recognition target vehicle 50 as the reference marker information, and to perform recognition level calculation using a number recognition rate of the plate.

It is assumed that a recognition level calculation mode as follows has been notified:

in a case where all numbers of the license plate number have been successfully recognized, the recognition level=1;

in a case where a half of the numbers of the license plate number has been successfully recognized, the recognition level=3; and in a case where all the numbers of license plate number have failed to be recognized, the recognition level=5.

Furthermore, it is assumed that a recognition level calculation result has been set to be notified to the recognition execution infrastructure 70 every five seconds.

The management server 20 also instructs the recognition execution infrastructure 70 to sense an area of surroundings of 500 m.

As the vehicle detection processing, an instruction is given to detect a license plate similar to the above.

(Steps S32 to S36)

In accordance with notification from the management server 20, the recognition execution vehicle 60 has executed sensing of surroundings of 500 m when entering a highway. When the recognition target vehicle 50 has been found and the recognition level has been calculated, the recognition level has been 5 (undetectable).

In accordance with notification from the management server 20, the recognition execution infrastructure 70 is notified of the calculated recognition level every five seconds.

Note that, although not illustrated in a sequence diagram of (Processing example C) illustrated in FIG. 4, the recognition execution vehicle 60 may perform a process of notifying the recognition target vehicle 50 of the calculated recognition level every five seconds.

Furthermore, the management server 20 may be set to notify the recognition execution vehicle 60 to perform such notification processing.

When the recognition execution infrastructure 70 has also calculated a recognition level, the recognition level has been 5 (undetectable).

In order to increase the recognition level, the recognition execution infrastructure 70 has increased luminance of a light of a surrounding infrastructure.

(Steps S37 to S38)

Moreover, as the processing of step S37, the recognition execution infrastructure 70 instructs the recognition target vehicle 50 to perform control for increasing the recognition level.

For example, the following instruction is performed.

For example, a control instruction is transmitted to perform the following processes:

reducing a traveling speed;

turning on a light to improve the recognition level; and transmitting communication data including vehicle location information, vehicle speed information, vehicle size information, reference marker position information, and the like.

(Step S38)

Next, in step S38, the recognition target vehicle 50 executes control in accordance with the control instruction from the recognition execution infrastructure 70.

Specifically, for example, the following processes are performed in accordance with the control instruction from the recognition execution infrastructure 70.

(a) Reducing a current traveling speed, and switching to slow driving. Alternatively, performing processing such as emergency stop.

(b) Turning on a light to improve the recognition level.

(c) Generating communication data including vehicle location information, vehicle speed information, vehicle size information, reference marker position information, and the like and transmitting to the surroundings.

These processes allow the surrounding vehicle of the recognition target vehicle 50 to obtain location information and a speed of the target vehicle in real time, so that higher detection can be performed.

[5. About Configuration Example of Vehicle Control System]

Next, a configuration example of a vehicle control system provided in the vehicle 10 will be described with reference to FIG. 6.

Figure 6:
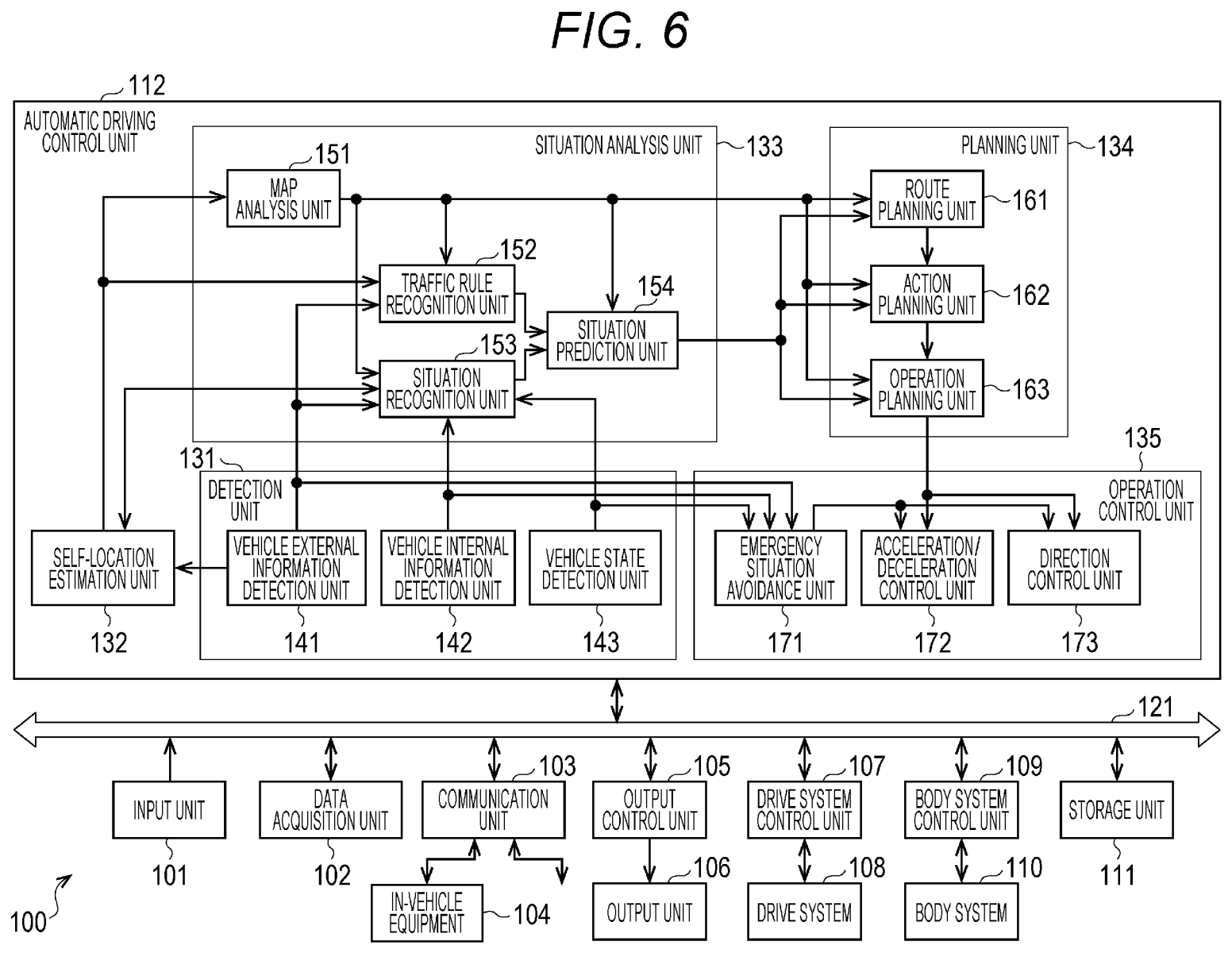

FIG. 6 is a block diagram illustrating a configuration example of a schematic function of a vehicle control system 100 provided in the vehicle 10 such as an automobile, which is a mobile device configured to execute the above-described processing.

Note that, hereinafter, in a case of distinguishing from other vehicles, the vehicle provided with the vehicle control system 100 is referred to as an own car or an own vehicle.

The vehicle control system 100 includes an input unit 101, a data acquisition unit 102, a communication unit 103, in-vehicle equipment 104, an output control unit 105, an output unit 106, a drive system control unit 107, a drive system 108, a body system control unit 109, a body system 110, a storage unit 111, and an automatic driving control unit 112. The input unit 101, the data acquisition unit 102, the communication unit 103, the output control unit 105, the drive system control unit 107, the body system control unit 109, the storage unit 111, and the automatic driving control unit 112 are mutually connected via a communication network 121. The communication network 121 includes, for example, a bus and an in-vehicle communication network conforming to any standard, such as a controller area network (CAN), a local interconnect network (LIN), a local area network (LAN), or FlexRay (registered trademark). Note that there may be a case where each unit of the vehicle control system 100 is directly connected without via the communication network 121.

Note that, hereinafter, in a case where each unit of the vehicle control system 100 communicates via the communication network 121, the description of the communication network 121 is to be omitted. For example, in a case where the input unit 101 and the automatic driving control unit 112 communicate via the communication network 121, it is simply described that the input unit 101 and the automatic driving control unit 112 communicate.

The input unit 101 includes a device used by a passenger for inputting various data, instructions, and the like. For example, the input unit 101 includes: operation devices such as a touch panel, a button, a microphone, a switch, and a lever; an operation device that can be inputted by a method other than manual operation, such as with voice or a gesture; and the like. Furthermore, for example, the input unit 101 may be a remote control device using infrared ray or other radio waves, or external connection equipment such as mobile equipment or wearable equipment corresponding to an operation of the vehicle control system 100. The input unit 101 generates an input signal on the basis of data, instructions, and the like inputted by the passenger, and supplies to each unit of the vehicle control system 100.

The data acquisition unit 102 includes various sensors and the like that acquire data to be used for processing of the vehicle control system 100, and supplies the acquired data to each unit of the vehicle control system 100.

For example, the data acquisition unit 102 includes various sensors for detection of a state and the like of the own car. Specifically, for example, the data acquisition unit 102 includes a gyro sensor, an acceleration sensor, an inertial measurement unit (IMU), and a sensor and the like for detection of an accelerator pedal operation amount, a brake pedal operation amount, a steering angle of a steering wheel, an engine speed, a motor speed, a wheel speed, and the like.

Furthermore, for example, the data acquisition unit 102 includes various sensors for detection of information external to the own car. Specifically, for example, the data acquisition unit 102 includes an imaging device such as a time of flight (ToF) camera, a visible light camera, a stereo camera, a monocular camera, an (far-)infrared camera, and other camera. Furthermore, for example, the data acquisition unit 102 includes an environment sensor for detection of weather, meteorological phenomena, or the like, and a peripheral information detection sensor for detection of an object around the own car. The environment sensor includes, for example, a raindrop sensor, a fog sensor, a sunshine sensor, a snow sensor, and the like. The peripheral information detection sensor includes, for example, an ultrasonic sensor, a radar, light detection and ranging or laser imaging detection and ranging (LiDAR), a sonar, and the like.

Moreover, for example, the data acquisition unit 102 includes various sensors for detection of a current location of the own car. Specifically, for example, the data acquisition unit 102 includes a global navigation satellite system (GNSS) receiver or the like configured to receive a GNSS signal from a GNSS satellite.

Furthermore, for example, the data acquisition unit 102 includes various sensors for detection of internal information of the vehicle. Specifically, for example, the data acquisition unit 102 includes an imaging device configured to capture an image of a driver, a biological sensor configured to detect biological information of the driver, a microphone configured to collect sound in a vehicle interior, and the like. The biological sensor is provided on, for example, a seat surface, a steering wheel, and the like, and detects biological information of the passenger sitting on the seat or the driver gripping the steering wheel.

The communication unit 103 communicates with the in-vehicle equipment 104, and various types of equipment, a server, a base station, and the like external to the vehicle, to transmit data supplied from each unit of the vehicle control system 100 and supply the received data to each unit of the vehicle control system 100. Note that a communication protocol supported by the communication unit 103 is not particularly limited, and the communication unit 103 can also support a plurality of types of communication protocols.

For example, the communication unit 103 performs wireless communication with the in-vehicle equipment 104 through wireless LAN, Bluetooth (registered trademark), near field communication (NFC), a wireless USB (WUSB), or the like. Furthermore, for example, the communication unit 103 performs wired communication with the in-vehicle equipment 104 through a universal serial bus (USB), a high-definition multimedia interface (HDMI) (registered trademark), a mobile high-definition link (MHL), or the like, via a connection terminal (not illustrated) (and a cable if necessary).

Moreover, for example, via a base station or an access point, the communication unit 103 communicates with equipment (for example, an application server or a control server) existing on an external network (for example, the Internet, a cloud network, or a network unique to a business operator). Furthermore, for example, the communication unit 103 uses a peer to peer (P2P) technology to communicate with a terminal (for example, a terminal of a pedestrian or a store, or a machine type communication (MTC) terminal) existing near the own car. Moreover, for example, the communication unit 103 performs V2X communication such as vehicle-to-vehicle communication, vehicle-to-infrastructure communication, communication between the own car and a house (vehicle-to-home), and vehicle-to-pedestrian communication. Furthermore, for example, the communication unit 103 includes a beacon reception unit, and receives radio waves or electromagnetic waves transmitted from a wireless station or the like installed on a road, and acquires information such as a current location, traffic jam, traffic regulation, a required time, and the like.

The in-vehicle equipment 104 includes, for example, mobile equipment or wearable equipment owned by the passenger, information equipment carried in or attached to the own car, a navigation device that searches for a route to any given destination, and the like.

The output control unit 105 controls output of various information to the passenger of the own car or outside of the vehicle. For example, the output control unit 105 controls output of visual information and auditory information from the output unit 106 by generating an output signal including at least one of visual information (for example, image data) or auditory information (for example, sound data), and supplying to the output unit 106. Specifically, for example, the output control unit 105 combines image data captured by different imaging devices of the data acquisition unit 102 to generate an overhead view image, a panoramic image, or the like, and supplies an output signal including the generated image to the output unit 106. Furthermore, for example, the output control unit 105 generates sound data including warning sound, a warning message, or the like for dangers such as collision, contact, entry into danger zone, and the like, and supplies an output signal including the generated sound data to the output unit 106.

The output unit 106 includes a device capable of outputting visual information or auditory information to the passenger of the own car or outside of the vehicle. For example, the output unit 106 includes a display device, an instrument panel, audio speakers, headphones, a wearable device such as a glasses-type display worn by the passenger, a projector, a lamp, and the like. The display device provided to the output unit 106 may be, for example, a device that displays visual information in a driver's field of view, such as a device or the like having a head-up display, a transmissive display, or an augmented reality (AR) display function, in addition to a device having a normal display.

The drive system control unit 107 controls the drive system 108 by generating various control signals and supplying to the drive system 108. Furthermore, the drive system control unit 107 supplies a control signal to each unit other than the drive system 108 as necessary, and gives notification or the like of a control state of the drive system 108.

The drive system 108 includes various devices related to a drive system of the own car. For example, the drive system 108 includes: a driving force generation device for generation of a driving force such as an internal combustion engine or a driving motor, a driving force transmission mechanism for transmission of a driving force to wheels, a steering mechanism to adjust a steering angle, a braking device to generate a braking force, an antilock brake system (ABS), an electronic stability control (ESC), an electric power steering device, and the like.

The body system control unit 109 controls the body system 110 by generating various control signals and supplying to the body system 110. Furthermore, the body system control unit 109 supplies a control signal to each unit other than the body system 110 as necessary, and gives notification or the like of a control state of the body system 110.

The body system 110 includes various body system devices of mounted on a vehicle body. For example, the body system 110 includes a keyless entry system, a smart key system, a power window device, a power seat, a steering wheel, an air conditioner, various lamps (for example, such as a head lamp, a back lamp, a brake lamp, a turn indicator, and a fog lamp), and the like.

The storage unit 111 includes, for example, a magnetic storage device such as a read only memory (ROM), a random access memory (RAM), and a hard disc drive (HDD), a semiconductor storage device, an optical storage device, a magneto-optical storage device, and the like. The storage unit 111 stores various programs, data, and the like used by each unit of the vehicle control system 100. For example, the storage unit 111 stores map data such as a three-dimensional high-accuracy map such as a dynamic map, a global map that is less accurate than the high-accuracy map and covers a wide area, and a local map that includes information of surroundings of the own car.

The automatic driving control unit 112 performs control related to automatic driving such as autonomous traveling or driving assistance. Specifically, for example, the automatic driving control unit 112 performs cooperative control for the purpose of realizing functions of advanced driver assistance system (ADAS) including avoidance of collisions or mitigation of impacts of the own car, follow-up traveling based on a distance between vehicles, vehicle speed maintenance traveling, collision warning of the own car, lane departure warning of the own car, and the like. Furthermore, for example, the automatic driving control unit 112 performs cooperative control for the purpose of automatic driving or the like of autonomously traveling without depending on an operation of the driver. The automatic driving control unit 112 includes a detection unit 131, a self-location estimation unit 132, a situation analysis unit 133, a planning unit 134, and an operation control unit 135.

The detection unit 131 detects various kinds of information necessary for controlling the automatic driving. The detection unit 131 includes a vehicle external information detection unit 141, a vehicle internal information detection unit 142, and a vehicle state detection unit 143.

The vehicle external information detection unit 141 performs detection processing on information external to the own car, on the basis of data or a signal from each unit of the vehicle control system 100. For example, the vehicle external information detection unit 141 performs detection processing, recognition processing, and tracking processing on an object around the own car, and detection processing on a distance to the object. Objects to be detected include, for example, vehicles, people, obstacles, structures, roads, traffic lights, traffic signs, road markings, and the like. Furthermore, for example, the vehicle external information detection unit 141 performs detection processing on a surrounding environment of the own car. The surrounding environment to be detected includes, for example, weather, a temperature, a humidity, a brightness, road surface conditions, and the like. The vehicle external information detection unit 141 supplies data indicating a result of the detection processing to the self-location estimation unit 132, a map analysis unit 151, a traffic rule recognition unit 152, a situation recognition unit 153 of the situation analysis unit 133, an emergency situation avoidance unit 171 of the operation control unit 135, and the like.

The vehicle internal information detection unit 142 performs detection processing on internal information of the vehicle on the basis of data or a signal from each unit of the vehicle control system 100. For example, the vehicle internal information detection unit 142 performs diver authentication processing and recognition processing, driver's state detection processing, passenger detection processing, detection processing on an environment inside the vehicle, and the like. The driver's state to be detected includes, for example, a physical condition, an awakening degree, a concentration degree, a fatigue degree, a line-of-sight direction, and the like. The environment inside the vehicle to be detected includes, for example, a temperature, a humidity, a brightness, odor, and the like. The vehicle internal information detection unit 142 supplies data indicating a result of the detection processing to the situation recognition unit 153 of the situation analysis unit 133, the emergency situation avoidance unit 171 of the operation control unit 135, and the like.

The vehicle state detection unit 143 performs detection processing on a state of the own car, on the basis of data or a signal from each unit of the vehicle control system 100. The state of the own car to be detected includes, for example, a velocity, an acceleration, a steering angle, the presence/absence and contents of an abnormality, a state of driving operation, a position and inclination of a power seat, a state of a door lock, a state of other in-vehicle equipment, and the like. The vehicle state detection unit 143 supplies data indicating a result of the detection processing to the situation recognition unit 153 of the situation analysis unit 133, the emergency situation avoidance unit 171 of the operation control unit 135, and the like.

The self-location estimation unit 132 performs estimation processing on, for example, a location and a position of the own car, on the basis of data or a signal from each unit of the vehicle control system 100, such as the vehicle external information detection unit 141, and the situation recognition unit 153 of the situation analysis unit 133. Furthermore, the self-location estimation unit 132 generates a local map (hereinafter, referred to as a self-location estimation map) to be used for self-location estimation, as necessary. The self-location estimation map is, for example, a highly accurate map using a technology such as simultaneous localization and mapping (SLAM). The self-location estimation unit 132 supplies data indicating a result of the estimation processing to the map analysis unit 151, the traffic rule recognition unit 152, and the situation recognition unit 153 of the situation analysis unit 133, and the like. Furthermore, the self-location estimation unit 132 causes the storage unit 111 to store the self-location estimation map.

The situation analysis unit 133 performs analysis processing on a situation of the own car and the surroundings. The situation analysis unit 133 includes the map analysis unit 151, the traffic rule recognition unit 152, the situation recognition unit 153, and a situation prediction unit 154.

While using data or a signal from each unit of the vehicle control system 100 such as the self-location estimation unit 132 and the vehicle external information detection unit 141 as necessary, the map analysis unit 151 performs analysis processing on various maps stored in the storage unit 111, and constructs a map including information necessary for processing of automatic driving. The map analysis unit 151 supplies the constructed map to the traffic rule recognition unit 152, the situation recognition unit 153, the situation prediction unit 154, and a route planning unit 161, an action planning unit 162, and an operation planning unit 163 of the planning unit 134, and the like.

The traffic rule recognition unit 152 performs recognition processing on traffic rules around the own car, on the basis of data or a signal from each unit of the vehicle control system 100 such as the self-location estimation unit 132, the vehicle external information detection unit 141, and the map analysis unit 151. By this recognition processing, for example, a location and a state of traffic lights around the own car, contents of traffic regulation around the own car, a lane that can be traveled, and the like are recognized. The traffic rule recognition unit 152 supplies data indicating a result of the recognition processing to the situation prediction unit 154 and the like.

The situation recognition unit 153 performs situation recognition processing related to the own car, on the basis of data or a signal from each unit of the vehicle control system 100 such as the self-location estimation unit 132, the vehicle external information detection unit 141, the vehicle internal information detection unit 142, the vehicle state detection unit 143, and the map analysis unit 151. For example, the situation recognition unit 153 performs recognition processing on a situation of the own car, a situation around the own car, a situation of the driver of the own car, and the like. Furthermore, the situation recognition unit 153 generates a local map (hereinafter, referred to as a situation recognition map) used for recognizing a situation around the own car, as necessary. The situation recognition map is, for example, an occupancy grid map.

The situation of the own car to be recognized includes, for example, a location, a position, and a motion (for example, a velocity, an acceleration, a moving direction, and the like) of the own car, the presence/absence and contents of an abnormality, and the like. The situation around the own car to be recognized includes, for example, a type and a location of a surrounding stationary object, a type, a location, and a motion (for example, a velocity, an acceleration, a moving direction, and the like) of a surrounding moving object, a configuration of a surrounding road and a condition of a road surface, surrounding weather, temperature, humidity, and brightness, and the like. The driver's state to be recognized includes, for example, a physical condition, an awakening degree, a concentration degree, a fatigue degree, a motion of a line-of-sight, driving operation, and the like.

The situation recognition unit 153 supplies data indicating a result of the recognition processing (including the situation recognition map as necessary) to the self-location estimation unit 132, the situation prediction unit 154, and the like. Furthermore, the situation recognition unit 153 causes the storage unit 111 to store the situation recognition map.

The situation prediction unit 154 performs prediction processing on a situation related to the own car, on the basis of data or a signal from each unit of the vehicle control system 100 such as the map analysis unit 151, the traffic rule recognition unit 152, and the situation recognition unit 153. For example, the situation prediction unit 154 performs prediction processing on a situation of the own car, a situation around the own car, a situation of a driver, and the like.

The situation of the own car to be predicted includes, for example, a behavior of the own car, an occurrence of an abnormality, a traveling distance, and the like. The situation around the own car to be predicted includes, for example, a behavior of a moving object around the own car, a change in a signal state, a change in an environment such as weather, and the like. The situation of the driver to be predicted includes, for example, a behavior, a physical condition, and the like of the driver.

The situation prediction unit 154 supplies data indicating a result of the prediction processing, together with data from the traffic rule recognition unit 152 and the situation recognition unit 153, to the route planning unit 161, the action planning unit 162, and the operation planning unit 163 of the planning unit 134, and the like.

The route planning unit 161 plans a route to a destination on the basis of data or a signal from each unit of the vehicle control system 100 such as the map analysis unit 151 and the situation prediction unit 154. For example, the route planning unit 161 sets a route from a current location to a designated destination on the basis of the global map. Furthermore, for example, the route planning unit 161 changes a route as appropriate on the basis of a situation such as traffic jam, an accident, traffic restriction, and construction, a physical condition of the driver, and the like. The route planning unit 161 supplies data indicating the planned route to the action planning unit 162 and the like.

The action planning unit 162 plans an action of the own car for safely traveling on the route planned by the route planning unit 161 within a planned time, on the basis of data or a signal from each unit of the vehicle control system 100 such as the map analysis unit 151 and the situation prediction unit 154. For example, the action planning unit 162 plans start, stop, a traveling direction (for example, forward, backward, left turn, right turn, direction change, and the like), a traveling lane, a traveling speed, overtaking, and the like. The action planning unit 162 supplies data indicating the planned action of the own car to the operation planning unit 163 and the like.

The operation planning unit 163 plans an operation of the own car for realizing an action planned by the action planning unit 162, on the basis of data or a signal from each unit of the vehicle control system 100 such as the map analysis unit 151 and the situation prediction unit 154. For example, the operation planning unit 163 plans acceleration, deceleration, a traveling trajectory, and the like. The operation planning unit 163 supplies data indicating the planned operation of the own car to an acceleration/deceleration control unit 172 and a direction control unit 173 of the operation control unit 135, and the like.

The operation control unit 135 controls an operation of the own car. The operation control unit 135 includes the emergency situation avoidance unit 171, the acceleration/deceleration control unit 172, and the direction control unit 173.

The emergency situation avoidance unit 171 performs detection processing on emergency situations such as a collision, contact, entry into a danger zone, a driver abnormality, and a vehicle abnormality, on the basis of detection results of the vehicle external information detection unit 141, the vehicle internal information detection unit 142, and the vehicle state detection unit 143. In a case of detecting an occurrence of an emergency situation, the emergency situation avoidance unit 171 plans an operation of the own car to avoid the emergency situation, such as a sudden stop or a sharp turn. The emergency situation avoidance unit 171 supplies data indicating the planned operation of the own car to the acceleration/deceleration control unit 172, the direction control unit 173, and the like.

The acceleration/deceleration control unit 172 performs acceleration/deceleration control for realizing the operation of the own car planned by the operation planning unit 163 or the emergency situation avoidance unit 171. For example, the acceleration/deceleration control unit 172 calculates a control target value of the driving force generation device or the braking device to achieve a planned acceleration and deceleration or a sudden vehicle stop, and supplies a control command indicating the calculated control target value to the drive system control unit 107.

The direction control unit 173 performs direction control for realizing the operation of the own car planned by the operation planning unit 163 or the emergency situation avoidance unit 171. For example, the direction control unit 173 calculates a control target value of a steering mechanism for achieving a traveling trajectory or a sharp turn planned by the operation planning unit 163 or the emergency situation avoidance unit 171, and supplies a control command indicating the calculated control target value to the drive system control unit 107.

[6. About Configuration Example of Information Processing Apparatus]

FIG. 6 illustrates a configuration of the vehicle control system 100, which is an example of a mobile object control system that can be mounted in a vehicle configured to execute the above-described processing. However, a configuration can be adopted in which the processing according to the embodiment described above is performed by inputting detection information of various sensors to an information processing apparatus such as a PC.

Next, a specific hardware configuration example of the information processing apparatus in this case will be described with reference to FIG. 7.

Figure 7:
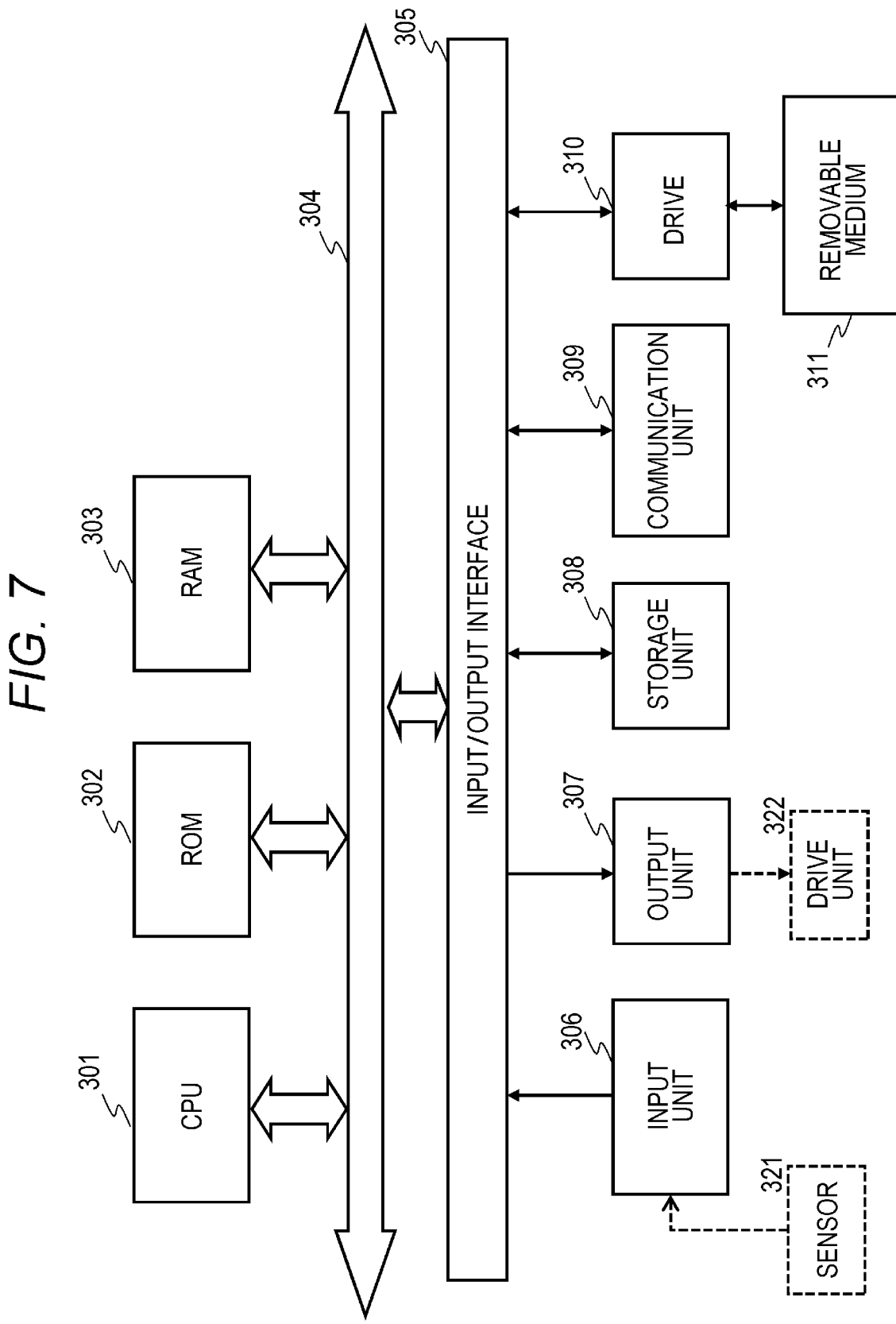
FIG. 7 is a diagram illustrating an example of a hardware configuration of an information processing apparatus.

FIG. 7 is a diagram illustrating a hardware configuration example of an information processing apparatus such as a general PC.

A central processing unit (CPU) 301 functions as a data processing unit configured to execute various kinds of processing in accordance with a program stored in a read only memory (ROM) 302 or a storage unit 308. For example, the processing according to the sequence described in the above-described embodiment is executed. A random access memory (RAM) 303 stores a program executed by the CPU 301 and data. These CPU 301, ROM 302, and RAM 303 are connected to each other by a bus 304.

The CPU 301 is connected to an input/output interface 305 via the bus 304. The input/output interface 305 is connected with an input unit 306 including various switches, a keyboard, a touch panel, a mouse, a microphone, a situation data acquisition unit such as a sensor, a camera, and GPS, and the like, and with an output unit 307 including a display, a speaker, and the like.

Note that input information from a sensor 321 is also inputted to the input unit 306.

Furthermore, the output unit 307 also outputs drive information for a drive unit 322 of a mobile device.

The CPU 301 inputs commands, status data, and the like inputted from the input unit 306, executes various kinds of processing, and outputs processing results to, for example, the output unit 307.

The storage unit 308 connected to the input/output interface 305 includes, for example, a hard disk or the like, and stores a program executed by the CPU 301 and various data. A communication unit 309 functions as a transmission/reception unit for data communication via a network such as the Internet or a local area network, and communicates with an external device.

A drive 310 connected to the input/output interface 305 drives a removable medium 311 such as a magnetic disk, an optical disk, a magneto-optical disk, or a semiconductor memory such as a memory card, and executes data recording and reading.

[7. Summary of Configuration of Present Disclosure]

The embodiment of the present disclosure has been described in detail with reference to the specific embodiment. However, it is obvious that those skilled in the art can make modifications and substitutions of the embodiment without departing from the scope of the present disclosure. In other words, the present invention has been disclosed in the form of exemplification, and should not be construed as limiting. In order to determine the scope of the present disclosure, the section of the claims should be taken into consideration.

Note that the technology disclosed in this specification can have the following configurations.

(1) An information processing apparatus including:

a communication unit configured to receive a recognition level of an own vehicle, the recognition level being calculated by another vehicle or an infrastructure facility; and a control unit configured to execute control for improvement of a recognition level of the own vehicle in accordance with the received recognition level.

(2) The information processing apparatus according to (1), in which the control unit executes at least any process among the processes (a) to (c), that are (a) a process of reducing a traveling speed or stopping, (b) a process of turning on a light, and (c) a process of changing transmission information from the own vehicle, as control for improvement of a recognition level of the own vehicle.

(3) The information processing apparatus according to (1) or (2), in which as a process of changing transmission information from the own vehicle, the control unit executes a process of adding, to the transmission information, at least any information among vehicle location information, vehicle speed information, vehicle size information, or reference marker position information.

(4) The information processing apparatus according to any one of (1) to (3), in which a recognition level received via the communication unit is a quantized recognition level value, and the control unit compares the quantized recognition level value with a predetermined threshold value, and executes control for improvement of a recognition level of the own vehicle in a case where the quantized recognition level value is equal to or less than the predetermined threshold value.

(5) The information processing apparatus according to any one of (1) to (4), in which the control unit executes control according to a control mode received from a management server, as control for improvement of a recognition level of the own vehicle.

(6) The information processing apparatus according to any one of (1) to (5), in which the another vehicle or the infrastructure facility is configured to execute vehicle detection processing using a sensor, execute calculation processing of the recognition level on the basis of sensor detection information, and transmit a calculation result, and the control unit executes control for improvement of a recognition level of the own vehicle in accordance with a recognition level received from the another vehicle or the infrastructure facility.

(7) The information processing apparatus according to any one of (1) to (6), in which the another vehicle or the infrastructure facility is configured to execute calculation processing of the recognition level on the basis of likelihood information that is an index value indicating certainty of sensor detection information, and transmit a calculation result, and the control unit executes control for improvement of a recognition level of the own vehicle in accordance with a recognition level that has been received from the another vehicle or the infrastructure facility and is based on likelihood information.

(8) The information processing apparatus according to any one of (1) to (7), in which the another vehicle or the infrastructure facility is configured to execute calculation processing of the recognition level on the basis of a detection rate of a reference point attached to a recognition target vehicle, and transmit a calculation result, and the control unit executes control for improvement of a recognition level of the own vehicle in accordance with a recognition level that has been received from the another vehicle or the infrastructure facility and is based on a reference point detection rate.

(9) The information processing apparatus according to any one of (1) to (8), in which the another vehicle or the infrastructure facility is configured to execute calculation processing of the recognition level on the basis of a feature amount observed from a recognition target vehicle, and transmit a calculation result, and the control unit executes control for improvement of a recognition level of the own vehicle in accordance with a recognition level that has been received from the another vehicle or the infrastructure facility and is based on a feature amount.

(10) An information processing apparatus including:

a control unit configured to calculate a recognition level of a recognition target vehicle, and execute control for improvement of a recognition level in accordance with the calculated recognition level.

(11) The information processing apparatus according to (10), in which the control unit executes, as control for improvement of a recognition level, at least any of: changing a sensor to be applied to recognition processing; or changing a parameter to be applied to the recognition processing.

(12) The information processing apparatus according to (10) or (11), in which the information processing apparatus is an apparatus configured in a vehicle or a road facility infrastructure.

(13) An information processing system including: a recognition target vehicle; and a recognition execution vehicle, in which the recognition execution vehicle executes recognition processing of the recognition target vehicle, calculates a recognition level according to a recognition result, and transmits the calculated recognition level to the recognition target vehicle, and the recognition target vehicle executes control for improvement of a recognition level of an own vehicle in accordance with a recognition level received from the recognition execution vehicle.

(14) The information processing system according to (13), in which in the information processing system, further, an infrastructure facility executes recognition processing of the recognition target vehicle, calculates a recognition level according to a recognition result, and transmits the calculated recognition level to the recognition target vehicle, and the recognition target vehicle executes control for improvement of a recognition level of the own vehicle in accordance with a recognition level received from the infrastructure facility.

(15) The information processing system according to (13) or (14), in which the recognition target vehicle executes at least any process among the processes (a) to (c) that are, (a) a process of reducing a traveling speed or stopping, (b) a process of turning on a light, and (c) a process of changing transmission information from the own vehicle, as control for improvement of a recognition level of the own vehicle

(16) The information processing system according to any one of (13) to (15), in which the recognition execution vehicle executes control for improvement of the recognition level in accordance with a calculated recognition level.

(17) The information processing system according to any one of (13) to (16), in which the recognition target vehicle and the recognition execution vehicle execute processing according to notification information from a management server.

(18) The information processing system according to (17), in which the management server executes insurance premium calculation for the recognition target vehicle on the basis of a recognition level of the recognition target vehicle.

(19) The information processing system according to (14), in which the infrastructure information executes control for improvement of a recognition level in accordance with a calculated recognition level.

(20) An information processing method executed in an information processing apparatus, the information processing method including:

receiving, by a communication unit, a recognition level of an own vehicle, the recognition level being calculated by another vehicle or an infrastructure facility; and executing, by a control unit, control for improvement of a recognition level of the own vehicle in accordance with the received recognition level.

The series of processing described in the specification can be executed by hardware, software, or a combined configuration of both. In a case of executing processing by software, a program recording a processing sequence can be installed and executed in a memory in a computer incorporated in dedicated hardware, or a program can be installed and executed in a general-purpose computer capable of executing various types of processing. For example, the program can be recorded in advance on a recording medium. The program can be installed from a recording medium to a computer, or can be received via a network such as a local area network (LAN) or the Internet, and installed in a recording medium such as an incorporated hard disk.

Note that the various types of processing described in the specification may be executed not only in a chronological order in accordance with the description, but may also be executed in parallel or individually depending on processing capability of a device that executes the processing or depending on the necessity. Furthermore, a system in this specification is a logical set configuration of a plurality of devices, and is not limited to one in which a device of each configuration is in a same casing.

INDUSTRIAL APPLICABILITY

As described above, according to a configuration of an embodiment of the present disclosure, an apparatus and a method for receiving a recognition level of an own vehicle from another vehicle and/or an infrastructure facility and performing control to improve a recognition level are realized.

Specifically, for example, a recognition level of the own vehicle calculated by another vehicle or the infrastructure facility is received, and control for improvement of a recognition level of the own vehicle is executed in accordance with the received recognition level. As the control for improvement of a recognition level of the own vehicle, any process is executed among: (a) a process of reducing a traveling speed or stopping; (b) a process of turning on a light; and (c) a process of changing transmission information from the own vehicle. As the process of changing transmission information, a process of adding, to the transmission information, vehicle location information, vehicle speed information, vehicle size information, or reference marker position information is executed.

With this configuration, an apparatus and a method for receiving a recognition level of an own vehicle from another vehicle and/or an infrastructure facility and performing control to improve a recognition level are realized.

REFERENCE SIGNS LIST

1 Information processing system
10 Vehicle
20 Management server
50 Recognition target vehicle
60 execution vehicle
70 Recognition execution infrastructure
100 Vehicle control system
101 Input unit
102 Data acquisition unit
103 Communication unit
104 In-vehicle equipment
105 Output control unit
106 Output unit
107 Drive system control unit
108 Drive system
109 Body system control unit
110 Body system
111 Storage unit
112 Automatic driving control unit
121 Communication network
131 Detection unit
132 Self-location estimation unit
133 Situation analysis unit
134 Planning unit
135 Operation control unit
141 Vehicle external information detection unit
142 Vehicle internal information detection unit
143 Vehicle state detection unit
151 Map analysis unit
152 Traffic rule recognition unit
153 Situation recognition unit
154 Situation prediction unit
161 Route planning unit
162 Action planning unit
163 Operation planning unit
171 Emergency situation avoidance unit
172 Acceleration/deceleration control unit
173 Direction control unit
301 CPU
302 ROM
303 RAM
304 Bus
305 Input/output interface
306 Input unit
307 Output unit
308 Storage unit
309 Communication unit
310 Drive
311 Removable medium
321 Sensor
322 Drive unit

The invention claimed is:

1. An information processing apparatus, comprising:
a receiving unit configured to receive a recognition level of recognition of a first vehicle, wherein
the information processing apparatus is implementable in the first vehicle,
the recognition level is calculated by an external device that is external to the first vehicle, and
the recognition level includes a quantized recognition level value; and a control unit configured to:
compare the quantized recognition level value with a threshold value; and
control at least one function of the first vehicle based on the quantized recognition level value that is equal to or less than the threshold value.

2. The information processing apparatus according to claim 1, wherein the control of the at least one function includes control of at least one of:
a reduction of a traveling speed of the first vehicle,
a stopping operation of the first vehicle,
a turning on operation of a light of the first vehicle, or
a change of transmission information of the first vehicle.

3. The information processing apparatus according to claim 1, wherein the control unit is further configured to:
add, to transmission information, at least one of vehicle location information of the first vehicle, vehicle speed information of the first vehicle, vehicle size information of the first vehicle, or reference marker position information of the first vehicle; and
control transmission of the transmission information that includes the at least one of the vehicle location information, the vehicle speed information, the vehicle size information, or the reference marker position information.

4. The information processing apparatus according to claim 1, wherein
the receiving unit is further configured to receive information indicating a control mode from a management server, and
the control unit is further configured to control the at least one function of the first vehicle based on the control mode.

5. The information processing apparatus according to claim 1, wherein
the external device is in one of a second vehicle or an infrastructure facility, and
the external device:
detects the first vehicle using a sensor,
calculates the recognition level based on a result of the detection, and
transmits the calculated recognition level to the first vehicle.

6. The information processing apparatus according to claim 1, wherein
the external device is in one of a second vehicle or an infrastructure facility, and
the external device:
calculates the recognition level based on likelihood information that is an index value indicating a certainty of sensor detection information, and
transmits the calculated recognition level to the first vehicle.

7. The information processing apparatus according to claim 1, wherein
the external device is in one of a second vehicle or an infrastructure facility, and
the external device:
calculates the recognition level based on a detection rate of a reference point attached to the first vehicle, and
transmits the calculated recognition level to the first vehicle.

8. The information processing apparatus according to claim 1, wherein
the external device is in one of a second vehicle or an infrastructure facility, and the external device:

calculates the recognition level based on a feature amount of the first vehicle, and transmits the calculated recognition level to the first vehicle.

9. An information processing apparatus, comprising:

a control unit configured to:

calculate a recognition level of recognition of a first vehicle, wherein the information processing apparatus is implementable in one of a second vehicle or an infrastructure facility, and the recognition level includes a quantized recognition level value;

compare the quantized recognition level value with a threshold value; and control at least one function of the second vehicle based on the quantized recognition level value that is equal to or less than the threshold value.

10. The information processing apparatus according to claim 9, wherein the second vehicle includes a sensor, the control unit is further configured to calculate the recognition level based on the sensor and a specific parameter, and the control of the at least one function includes control of at least one of:

a change of the sensor, or a change of the specific parameter.

11. An information processing system, comprising:

a first vehicle; and a second vehicle configured to:

recognize the first vehicle;

calculate a first recognition level of the recognition of the first vehicle by the second vehicle, wherein the first recognition level includes a quantized recognition level value; and transmit the first recognition level to the first vehicle, wherein the first vehicle is configured to:

receive the first recognition level from the second vehicle;

compare the quantized recognition level value with a threshold value; and control at least one function of the first vehicle based on the quantized recognition level value that is equal to or less than the threshold value.

12. The information processing system according to claim 11, further comprising an infrastructure facility configured to:

recognize the first vehicle;

calculate a second recognition level of the recognition by the infrastructure facility; and transmit the second recognition level to the first vehicle, wherein the first vehicle is further configured to control the at least one function based on the second recognition level received from the infrastructure facility.

13. The information processing system according to claim 12, wherein the infrastructure facility is further configured to control at least one function of the infrastructure facility based on the second recognition level.

14. The information processing system according to claim 11, wherein the control of the at least one function of the first vehicle includes control of at least one of:

a reduction of a traveling speed of the first vehicle, a stopping operation of the first vehicle, a turning on operation of a light of the first vehicle, or a change of transmission information of the first vehicle.

15. The information processing system according to claim 11, wherein the second vehicle is further configured to control at least one function of the second vehicle based on the recognition level.

16. The information processing system according to claim 11, wherein each of the first vehicle and the second vehicle is further configured to receive notification information from a management server, the second vehicle is further configured to recognize the first vehicle based on the notification information, and the first vehicle is further configured to control the at least one function of the first vehicle based on the notification information.

17. The information processing system according to claim 16, wherein the management server calculates an insurance premium for the first vehicle based on the first recognition level.

18. An information processing method, comprising:

in an information processing apparatus implementable in a first vehicle:

receiving, by a receiving unit of the information processing apparatus, a recognition level of recognition of the first vehicle, wherein the recognition level is calculated by an external device that is external to the first vehicle, and the recognition level includes a quantized recognition level value;

comparing the quantized recognition level value with a threshold value; and controlling, by a control unit of the information processing apparatus, at least one function of the first vehicle based on the quantized recognition level value that is equal to or less than the threshold value.

* * * * *